US008489113B2

(12) United States Patent
Walter et al.

(10) Patent No.: US 8,489,113 B2
(45) Date of Patent: Jul. 16, 2013

(54) METHOD AND SYSTEM FOR TRACKING, MONITORING AND/OR CHARGING TRACKING DEVICES INCLUDING WIRELESS ENERGY TRANSFER FEATURES

(75) Inventors: Jerold Michael Walter, Atlanta, GA (US); James A. Franklin, Atlanta, GA (US); Roland Joseph Montalbo, Cumming, GA (US)

(73) Assignee: OmniLink Systems, Inc., Alpharetta, GA (US)

( * ) Notice: Subject to any disclaimer, the term of this patent is extended or adjusted under 35 U.S.C. 154(b) by 400 days.

(21) Appl. No.: 12/794,500

(22) Filed: Jun. 4, 2010

(65) Prior Publication Data

US 2011/0195722 A1    Aug. 11, 2011

Related U.S. Application Data

(60) Provisional application No. 61/302,673, filed on Feb. 9, 2010.

(51) Int. Cl.
*G08B 5/22* (2006.01)
*G01S 19/42* (2010.01)
*H04W 64/00* (2009.01)

(52) U.S. Cl.
USPC .................................. 455/456.1; 342/357.25

(58) Field of Classification Search
USPC ................ 455/404.1–404.2, 410, 414.1, 421, 455/422.1, 456.1–457; 342/357.2–357.78
See application file for complete search history.

(56) References Cited

U.S. PATENT DOCUMENTS

| 4,359,733 A | 11/1982 | O'Neill |
| 4,673,936 A | 6/1987 | Kotoh |
| 4,736,196 A | 4/1988 | McMahon |
| 4,747,120 A | 5/1988 | Foley |
| 4,750,197 A | 6/1988 | Denekamp et al. |
| 4,777,477 A | 10/1988 | Watson |
| 4,812,823 A | 3/1989 | Dickerson |
| 4,885,571 A | 12/1989 | Pauley |

(Continued)

FOREIGN PATENT DOCUMENTS

| DE | 19832671 | 1/2000 |
| EP | 0528090 | 2/1993 |

(Continued)

OTHER PUBLICATIONS

International Search Report and Written Opinion issued in PCT/US2011/023144 mailed Oct. 12, 2011.

(Continued)

*Primary Examiner* — Kashif Siddiqui
(74) *Attorney, Agent, or Firm* — DLA Piper LLP US

(57) ABSTRACT

A method and system for monitoring individuals or objects including tracking devices having wireless powering/charging features. In one embodiment, an exemplary tracking device may comprise a power receiving device that generates power from wireless energy received from a power transmitter configured to transmit the wireless energy, circuitry configured for processing tracking device location information, and communication circuitry configured to process data related to the wireless tracking device for transmission to an administrative hub that is configured to monitor locations of the individuals or objects based upon the data. Output power from the power receiving device may be used to operate the tracking device. Alternately or in addition, the tracking device may include a battery that provides power to the tracking device and is recharged by the power receiving device.

42 Claims, 23 Drawing Sheets

U.S. PATENT DOCUMENTS

| | | | |
|---|---|---|---|
| 4,918,425 | A | 4/1990 | Greenberg et al. |
| 4,918,432 | A | 4/1990 | Pauley et al. |
| 4,952,928 | A | 8/1990 | Carroll |
| 4,999,613 | A | 3/1991 | Williamson |
| 5,043,736 | A | 8/1991 | Darnell |
| 5,182,543 | A | 1/1993 | Siegel |
| 5,204,670 | A | 4/1993 | Stinton |
| 5,298,884 | A | 3/1994 | Gilmore |
| 5,365,516 | A | 11/1994 | Jandrell |
| 5,461,365 | A | 10/1995 | Schlager et al. |
| 5,461,390 | A | 10/1995 | Hoshen |
| 5,468,110 | A | 11/1995 | McDonald et al. |
| 5,471,197 | A | 11/1995 | McCurdy et al. |
| 5,493,694 | A | 2/1996 | Vlcek |
| 5,497,148 | A | 3/1996 | Oliva |
| 5,497,149 | A | 3/1996 | Fast |
| 5,504,474 | A | 4/1996 | Libman |
| 5,518,402 | A | 5/1996 | Tommarello |
| 5,523,740 | A | 6/1996 | Burgmann |
| 5,537,102 | A | 7/1996 | Pinnow |
| 5,552,772 | A | 9/1996 | Janky et al. |
| 5,559,520 | A | 9/1996 | Barzegar |
| 5,568,119 | A | 10/1996 | Schipper et al. |
| 5,593,267 | A | 1/1997 | McDonald et al. |
| 5,594,425 | A | 1/1997 | Ladner |
| 5,623,390 | A | 4/1997 | Noda et al. |
| 5,627,520 | A | 5/1997 | Grubbs |
| 5,646,632 | A | 7/1997 | Khan |
| 5,650,766 | A | 7/1997 | Burgmann |
| 5,650,770 | A | 7/1997 | Schlager et al. |
| 5,652,570 | A | 7/1997 | Lepkofker |
| 5,712,619 | A | 1/1998 | Simkin |
| 5,714,931 | A | 2/1998 | Petite et al. |
| 5,731,757 | A | 3/1998 | Layson |
| 5,742,233 | A | 4/1998 | Hoffman et al. |
| 5,742,509 | A | 4/1998 | Goldberg et al. |
| 5,748,148 | A | 5/1998 | Heiser |
| 5,752,976 | A | 5/1998 | Duffin |
| 5,825,283 | A | 10/1998 | Camhi |
| 5,828,987 | A | 10/1998 | Tano et al. |
| 5,835,377 | A | 11/1998 | Bush |
| 5,835,907 | A | 11/1998 | Newman |
| 5,838,237 | A | 11/1998 | Revell et al. |
| 5,852,401 | A | 12/1998 | Kita |
| 5,857,433 | A | 1/1999 | Files |
| 5,867,103 | A | 2/1999 | Taylor |
| 5,870,029 | A | 2/1999 | Otto et al. |
| 5,890,061 | A | 3/1999 | Timm |
| 5,892,454 | A | 4/1999 | Schipper et al. |
| D410,206 | S | 5/1999 | Slater |
| 5,905,461 | A | 5/1999 | Neher |
| 5,940,004 | A | 8/1999 | Fulton |
| 5,948,038 | A | 9/1999 | Daley et al. |
| 5,959,533 | A | 9/1999 | Layson, Jr. |
| 5,982,281 | A | 11/1999 | Layson, Jr. |
| 5,990,793 | A | 11/1999 | Bieback |
| 6,011,510 | A | 1/2000 | Yee et al. |
| 6,014,080 | A | 1/2000 | Layson, Jr. |
| 6,024,928 | A | 2/2000 | Foster |
| 6,054,928 | A | 4/2000 | Lemelson et al. |
| D424,463 | S | 5/2000 | Babers, Jr. |
| 6,072,396 | A | 6/2000 | Gaukel |
| 6,084,517 | A | 7/2000 | Rabanne |
| 6,084,547 | A | 7/2000 | Sanderford |
| 6,100,806 | A | 8/2000 | Gaukel |
| 6,104,295 | A | 8/2000 | Tenarvitz et al. |
| 6,131,067 | A | 10/2000 | Girerd et al. |
| 6,150,921 | A | 11/2000 | Werb |
| 6,160,481 | A | 12/2000 | Taylor, Jr. |
| 6,181,253 | B1 | 1/2001 | Eschenbach et al. |
| 6,198,431 | B1 | 3/2001 | Gibson |
| D440,170 | S | 4/2001 | Conerly |
| 6,218,945 | B1 | 4/2001 | Taylor, Jr. |
| 6,232,880 | B1 | 5/2001 | Anderson et al. |
| 6,232,916 | B1 | 5/2001 | Grillo |
| 6,239,700 | B1 | 5/2001 | Hoffman et al. |
| 6,278,370 | B1 | 8/2001 | Underwood |
| 6,344,794 | B1 | 2/2002 | Ulrich et al. |
| 6,353,406 | B1 | 3/2002 | Lanzl |
| 6,356,841 | B1 | 3/2002 | Hamrick et al. |
| 6,392,565 | B1 | 5/2002 | Brown |
| 6,405,213 | B1 | 6/2002 | Layson, Jr. |
| 6,430,813 | B2 | 8/2002 | Muraguchi et al. |
| 6,431,455 | B1 | 8/2002 | Ponert |
| 6,438,380 | B1 | 8/2002 | Bi |
| 6,483,427 | B1 | 11/2002 | Werb |
| 6,512,456 | B1 | 1/2003 | Taylor, Jr. |
| 6,581,546 | B1 | 6/2003 | Dalland |
| 6,606,556 | B2 | 8/2003 | Curatolo et al. |
| 6,624,750 | B1 | 9/2003 | Marman et al. |
| 6,639,516 | B1 | 10/2003 | Copley |
| 6,646,617 | B1 | 11/2003 | Gaukel |
| 6,703,936 | B2 | 3/2004 | Hill et al. |
| 6,711,500 | B2 | 3/2004 | Cheng |
| 6,747,555 | B2 | 6/2004 | Fellenstein et al. |
| 6,774,797 | B2 | 8/2004 | Freathy et al. |
| 6,774,799 | B2 | 8/2004 | Defant |
| 6,801,853 | B2 | 10/2004 | Workman |
| 6,812,824 | B1 | 11/2004 | Goldinger |
| 6,838,998 | B1 | 1/2005 | Brown |
| 6,840,904 | B2 | 1/2005 | Goldberg |
| 6,862,454 | B1 | 3/2005 | Kanevsky |
| RE38,838 | E | 10/2005 | Taylor |
| 6,961,592 | B2 | 11/2005 | O'Connor |
| 6,972,684 | B2 | 12/2005 | Copley |
| 6,975,222 | B2 | 12/2005 | Krishan |
| 6,975,234 | B2 | 12/2005 | Boccacci |
| 6,992,582 | B2 | 1/2006 | Hill |
| 7,015,817 | B2 | 3/2006 | Copley |
| 7,034,678 | B2 | 4/2006 | Burkley et al. |
| 7,034,695 | B2 | 4/2006 | Troxler |
| D520,393 | S | 5/2006 | Darby |
| 7,038,590 | B2 | 5/2006 | Hoffman et al. |
| 7,064,670 | B2 | 6/2006 | Galperin |
| 7,079,034 | B2 | 7/2006 | Stilp |
| 7,098,795 | B2 | 8/2006 | Adamczyk et al. |
| 7,119,695 | B2 | 10/2006 | Defant |
| D534,822 | S | 1/2007 | Wadda |
| D535,205 | S | 1/2007 | Frederick et al. |
| 7,209,757 | B2 | 4/2007 | Naghian et al. |
| 7,283,044 | B2 | 10/2007 | Bandy |
| 7,289,786 | B2 | 10/2007 | Krasner |
| RE39,909 | E | 11/2007 | Taylor, Jr. |
| 7,299,987 | B2 | 11/2007 | Yoo et al. |
| 7,382,268 | B2 | 6/2008 | Hartman |
| 7,492,254 | B2 | 2/2009 | Bandy et al. |
| 7,518,514 | B2 | 4/2009 | Bauchot et al. |
| 7,598,855 | B2 | 10/2009 | Scalisi et al. |
| 7,728,724 | B1 | 6/2010 | Scalisi et al. |
| 7,877,104 | B2 | 1/2011 | Turetzky |
| 7,884,712 | B2 | 2/2011 | Nierenberg |
| 2001/0048364 | A1 | 12/2001 | Kalthoff et al. |
| 2003/0030561 | A1 | 2/2003 | Yafuso |
| 2003/0034894 | A1 | 2/2003 | Montagnino |
| 2003/0112141 | A1 | 6/2003 | Arunkumar |
| 2003/0210142 | A1 | 11/2003 | Freathy et al. |
| 2003/0227382 | A1 | 12/2003 | Breed |
| 2005/0024202 | A1* | 2/2005 | Culpepper et al. ....... 340/539.13 |
| 2006/0109110 | A1 | 5/2006 | Hill |
| 2006/0266917 | A1 | 11/2006 | Baldis et al. |
| 2007/0276270 | A1 | 11/2007 | Tran |
| 2008/0001764 | A1 | 1/2008 | Douglas et al. |
| 2008/0055109 | A1 | 3/2008 | Freathy |
| 2008/0108370 | A1 | 5/2008 | Aninye |
| 2008/0278327 | A1 | 11/2008 | Nierenberg |
| 2009/0251313 | A1 | 10/2009 | Perkins |
| 2011/0128148 | A1 | 6/2011 | Nierenberg |

FOREIGN PATENT DOCUMENTS

| | | |
|---|---|---|
| EP | 0745867 | 12/1996 |
| EP | 1363258 | 11/2003 |
| GB | 2279170 | 12/1994 |
| GB | 2383666 | 7/2003 |
| WO | WO 88/09541 | 12/1988 |

OTHER PUBLICATIONS

File History of U.S. Appl. No. 12/639,524.
File History of U.S. Appl. No. 11/935,858.
File History of U.S. Appl. No. 12/112,695.
Notice of Allowance issued in EP Appl 06759293.1 on Dec. 7, 2010.
File History of U.S. Appl. No. 12/350,678.
U.S. Appl. No. 11/806,841, filed Jun. 1, 2007, Taylor, Jr.
U.S. Appl. No. 90/010,372, filed Dec. 26, 2008, Taylor.
Search Report issued in PCT/US2006/017541 on Jan. 31, 2007.
Search Report issued in PCT/US2006/017678 on Sep. 8, 2006.
Murphy, John. "Advanced Electronic Monitoring for Tracking Persons on Probation or Parole," Feb. 29, 1996, pp. 1-34 and Appendix A.
Hoshen, Joseph. "Keeping Tabs on Criminals," IEEE Spectrum, Feb. 1995, pp. 26-31.
Whitfield, Dick. "Tackling the Tag," Chapter 9, 1997, pp. 109-119.
Pro Tech Monitoring, Inc., SMART Systems Briefing, circa 1995-1996.
EBSCO Host, "'Spy' In the Sky," Onternational Construction, 00206415, Aug. 1997, vol. 36, Issue 8.
Gable, Ralph. "Application of Personal Telemonitoring to Current Problems in Corrections," Journal of Criminal Justice, vol. 14, pp. 167-176 (1986).
Holland, James. Political Implications of Applying Behavioral Pschology, Mexico City, 1972.
Mainprize, Steve. "Elective Affinities in the Engineering of Social Control: The Evolution of Electronic Monitoring," ISSN: 1198 3655, Electronic Journal of Sociology (1996).
Le Marshall, Chris. "Single Geostatic Orbital Satellite in Tracking Ground-Based Mobile Radio Transmitter," National Air Intelligence Center, Oct. 11, 1995.
Montes, Marisela. "Technological Advances in Parole Supervision," Corrections Today, vol. 58, Issue 4, Jul. 1996.
Nieto, Marcus. "Community Correction Punishments: An Alternative To Incarceration for Nonviolent Offenders," May 1996.
Schwitzgebel, Robert. "Psychotechnology Electronic Control of Mind and Behavior," Chapter 4, New York, 1973.
Reexamination Control No. 90/010,372 filed Dec. 26, 2008.
Wade, Andy. Book Review: *Tracking the Tag: The Electronic Monitoring of Offenders*, by Dick Whitfield, Probation Journal; 1997; 44; 234.
Harris County Invitation to Bid, Lease of Electronic Monitoring Equipment for the Harris County Community Supervision and Correction Department, circa 1994.
Electronic Monitoring: A listing of materials available at the Justice Institute Library, Oct. 6, 2006.
"Current Electronic Monitoring Market Place", circa 1995-1996.
Extended European Search Report issued in EP Appl 06759293.1 on Oct. 23, 2009.
Extended European Search Report issued in EP Appl 06740595.1 on Oct. 5, 2009.
European Search Report issued in EP Appl 10150064.3 on Mar. 12, 2010.
English Abstract of DE 19832671 published Jan. 27, 2000.
File History of U.S. Appl. No. 10/591,830.
File History of U.S. Appl. No. 11/935,833.
File History of U.S. Appl. No. 29/279,448.
International Preliminary Report of Patentability issued in PCT/US06/017541 dated Nov. 6, 2007.
International Preliminary Report of Patentability issued in PCT/US06/017678 dated Nov. 6, 2007.
File history of U.S. Patent No. 6,100,806.

\* cited by examiner

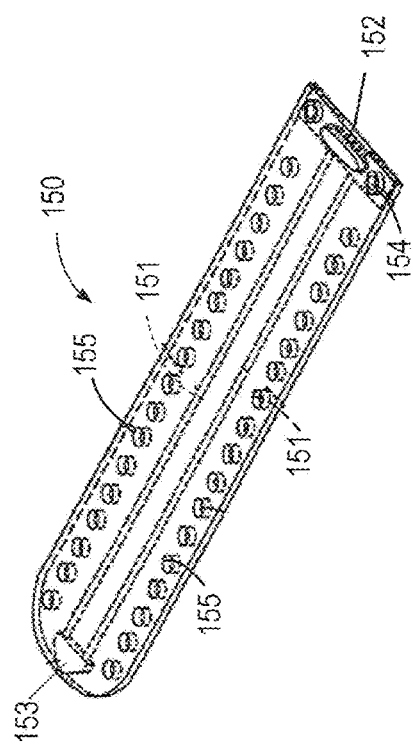
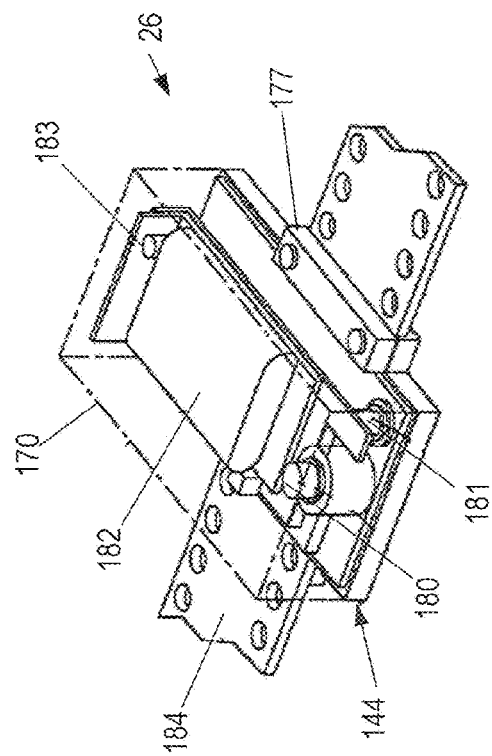

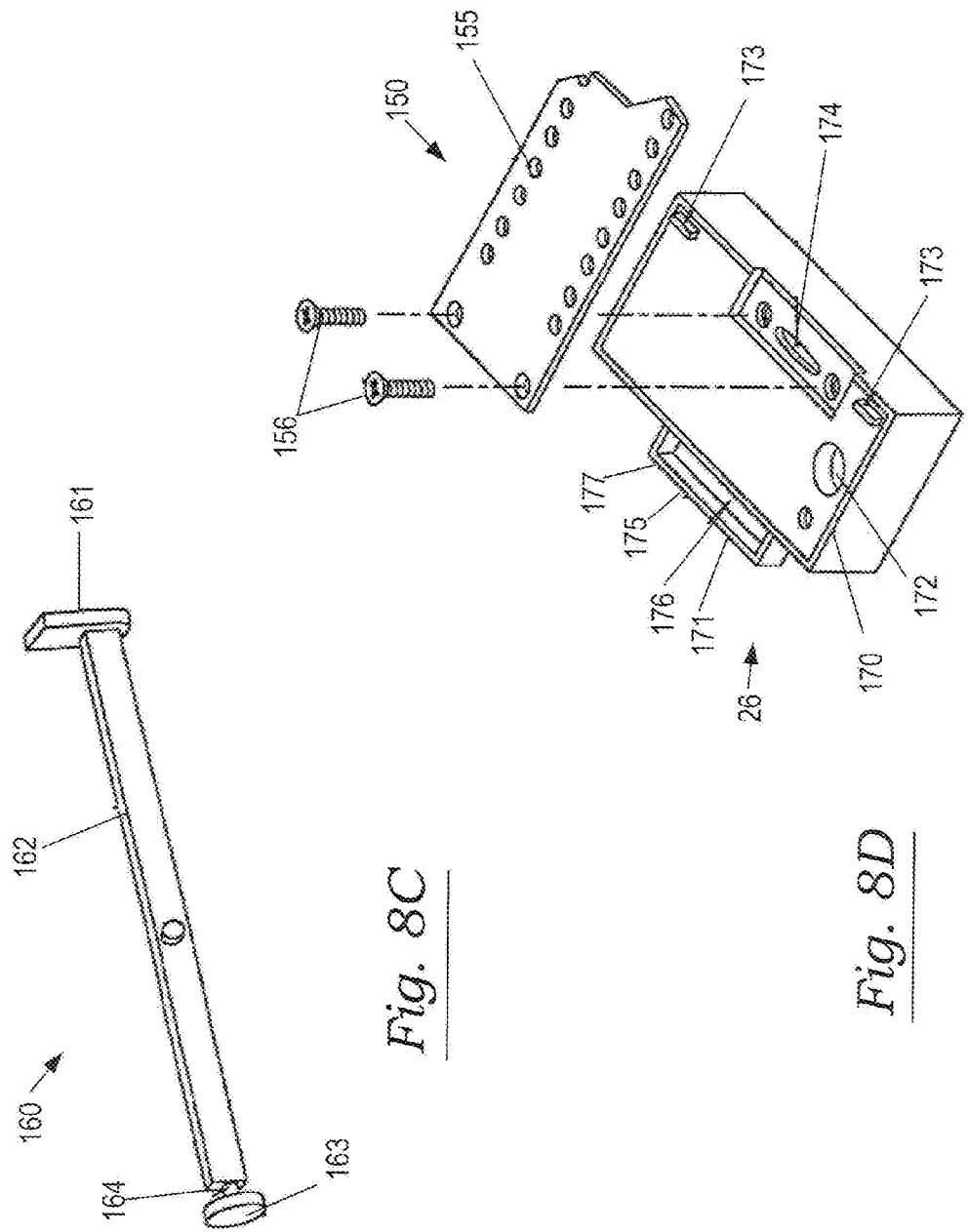

METHOD AND SYSTEM FOR TRACKING, MONITORING AND/OR CHARGING TRACKING DEVICES INCLUDING WIRELESS ENERGY TRANSFER FEATURES

This application claims priority to provisional application 61/302,673, entitled "Wirelessly Charged Tracking Device With Wireless Energy Transfer Capabilities", filed Feb. 9, 2010, which is herein incorporated by reference in its entirety.

BRIEF DESCRIPTION OF THE DRAWINGS

FIG. 8A is a perspective view of a tamper resistant strap for use with a wearable tracking device, according to an implementation of the innovations herein.

FIG. 8B is a perspective view of a wearable device with strap affixed, according to an implementation of the innovations herein.

FIG. 8C is a perspective view of a locking pin utilized to hold the strap of FIG. 8B in place, according to an implementation of the innovations herein.

FIG. 8D is a rear perspective view of a monitoring device, according to an implementation of the innovations herein.

DESCRIPTION OF EXEMPLARY IMPLEMENTATIONS

Figure 1:
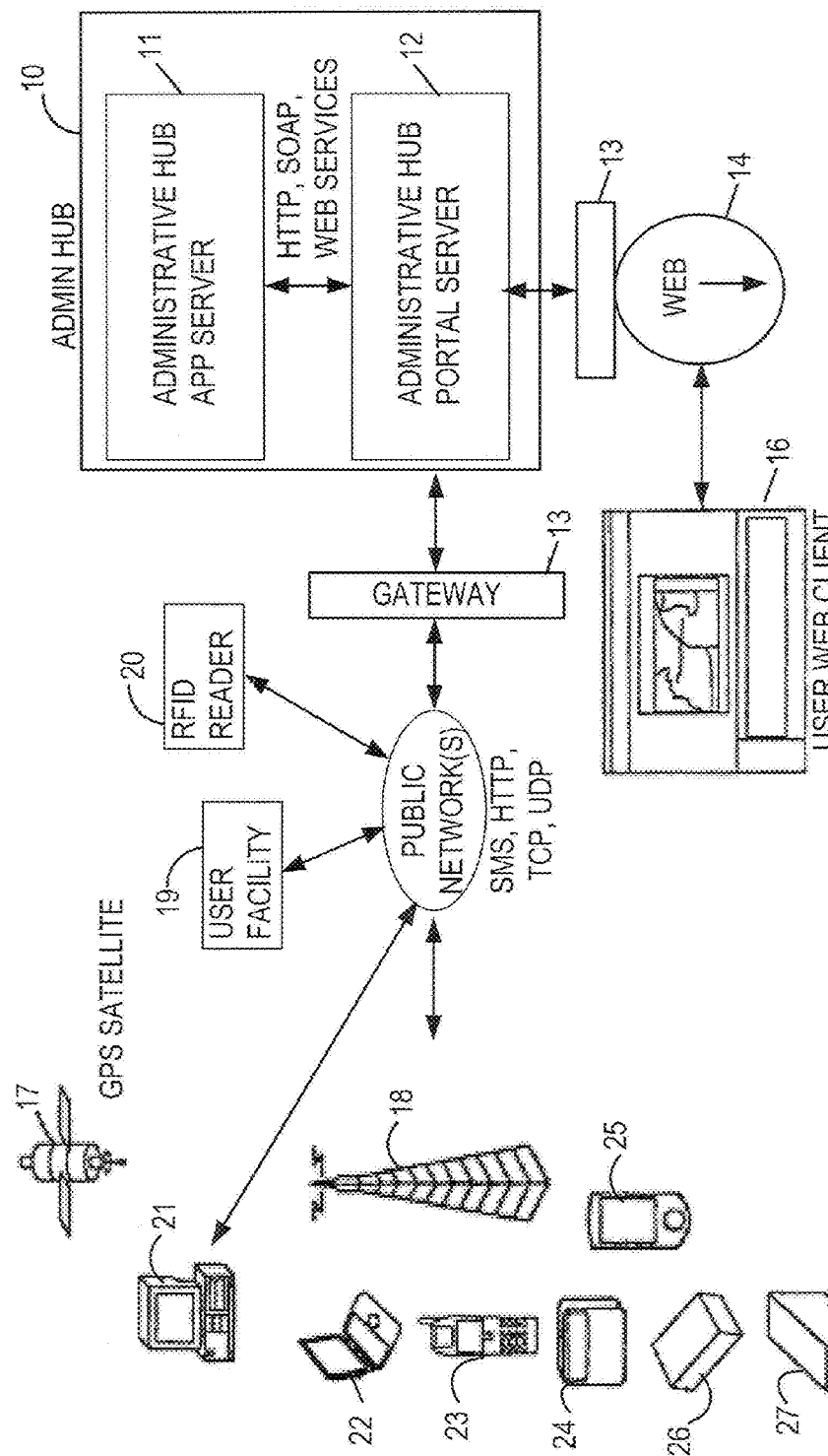
FIG. 1 illustrates a block diagram showing components of an exemplary system and communication paths among such components, according to an implementation of the innovations herein.

FIG. 1 illustrates a schematic overview of an exemplary communication path utilized consistent with aspects of the innovations herein. Control may be maintained at one or more administrative hubs 10 running application server 11 functionality and portal server 12 functionality. The portal server 12 will communicate through gateways 13, generally routers or a location aggregator, with the Internet 14 or some combination of public networks 15, possibly including the Internet, and telephone networks. Communications are then directed to and/or from a wide variety of devices with respect to the administrative hub 10. For instance, an RFID reader 20 may detect and report the presence of an RFID tag. The administrative hub 10 may generate a message to a controllable device user at facility 19 and receive a confirming acknowledgement. A user of the innovations herein may obtain information via personal computer 21, laptop computer 22, cell phone 23, Blackberry 24, Palm Pilot 25, smart phone or other digital communication device. The tracking device may be in a wearable ankle bracelet box 26, installed in a vehicle 27, installed in a stack of currency, installed in a cash cassette for an ATM, or operated on GPS enabled mobile communications devices such as Palm Pilots 25, Blackberrys 24, cell phones 23, smart phones, or even on appropriately configured laptop computers 22. If the tracking software is installed on these or similar devices, then location information generated from GPS satellite 17 and/or confirmed by assisted GPS location data for cell tower triangulation, together with any other types of data collected by the mobile communication device, is periodically transmitted to the administrative hub 10. A user of the system with access via a web enabled device is able to graphically display a variety of tracking device information utilizing web client 16. In addition, the user may generate messages to the administrative hub 10 or to any of the described communication enabled devices. Because the system is implemented in a device agnostic fashion, it is contemplated that the system will operate with a plurality of types of devices employed by both users who access data and by monitored persons.

Figure 2:
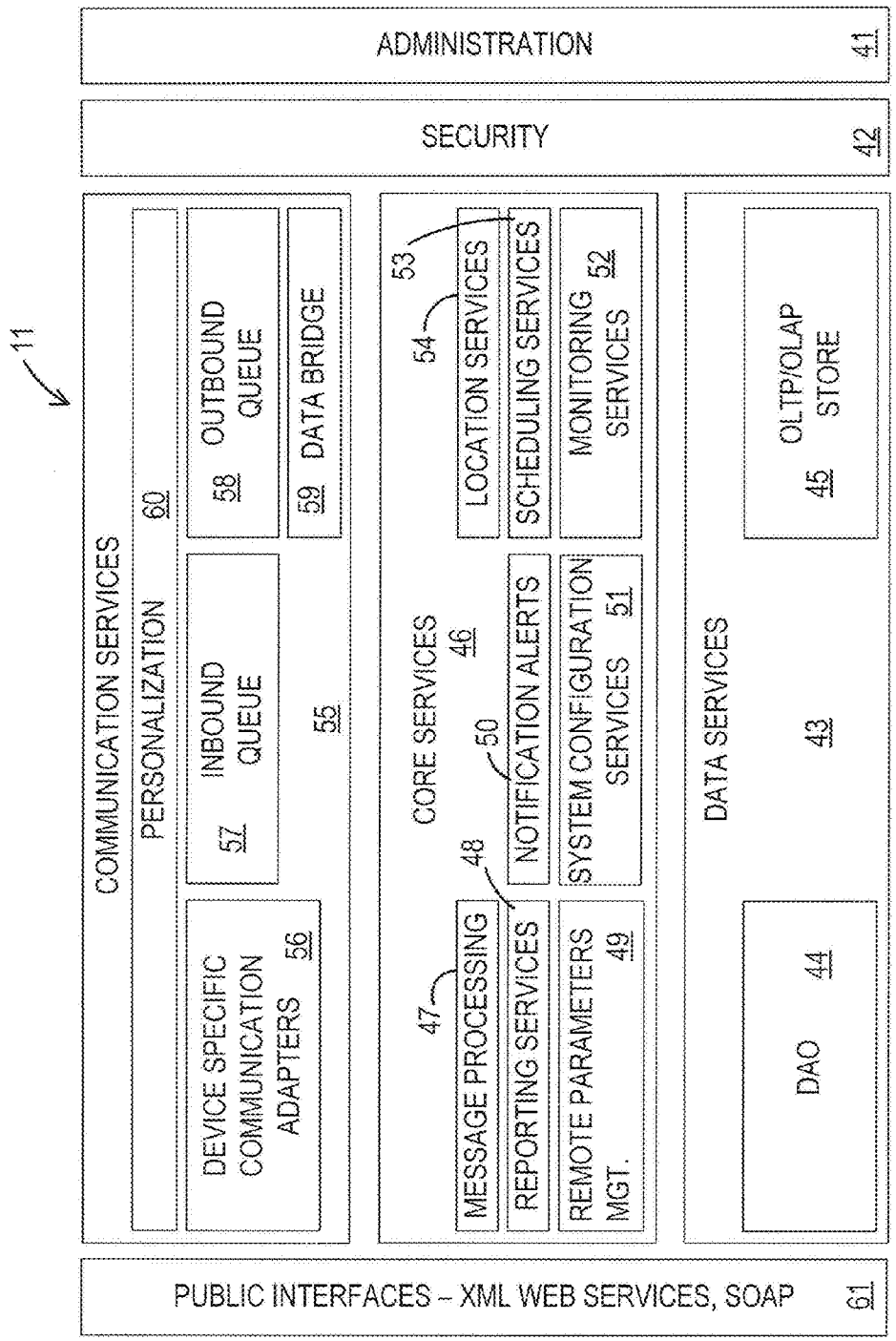
FIG. 2 illustrates a block diagram of functional architecture of an exemplary administrative hub server, according to an implementation of the innovations herein.

Turning then to an examination of the system components in greater detail, the logical architecture of a representative administrative hub application server 11 is shown in FIG. 2. This server has a standard administration 41 and security 42 functionality. The three principal categories of the services provided by the application server 11 are data services 43, core services 46, and communications services 55. Data services 43 include data housed in OLTP (Online Transaction Processing) or OLAP (Online Analytical Processing) relational or multidimensional databases 45 and data access objects (DAO) 44 to allow data access mechanisms to change independently of the code that uses the data. Core services 46 principally comprise message processor 47 for parsing and either acting upon or forwarding incoming messages for action and building and formatting outgoing messages in appropriate packet format; reporting services 48 for building reports from event logs stored in data services 43 and organizing the data for transmission to portal server 12; remote parameters management 49 for storing and managing parameters such as time intervals for a mobile unit to take location fixes and for initiating communications with administrative hub 10, and intervals for battery charge testing and reporting and battery charge requirements; notification/alerts 50 for configuring conditions that will generate alerts and reports, including persons to be notified for types of events, immediate or delayed timing for those notifications, and the communication methods to be employed in notifications; system configuration services 51 to hold parameters defining the system and user preferences which may include language choice, time zone, and the like; location services 54 to convert data from mobile units to position, and geocoding to or from a particular address, as well as performing assisted GPS location calculations and any necessary drift correction; scheduling services 53 for managing times including regular schedules for exclusion and inclusion zones, as well as special permissions or allowed variations from usual schedule, and required appointments at particular addresses; and monitoring services 52 for comparing reported locations against rules for the monitored individual's locations and generating appropriate information to the notification/alerts module 50 in the event of violations. The communication services component 55 includes inbound and outbound message queues 57, 58; communication adapters 56 to allow messaging with a variety of devices; data bridge 59 to permit data from core services to be formatted into outbound messages, and inbound messages to be formatted for access by core services 46; and personalization 68 to permit users to specify custom reports and preferred screen displays. Finally, an interface 61 such as XML protocol for accessing web services is provided.

Figure 3:
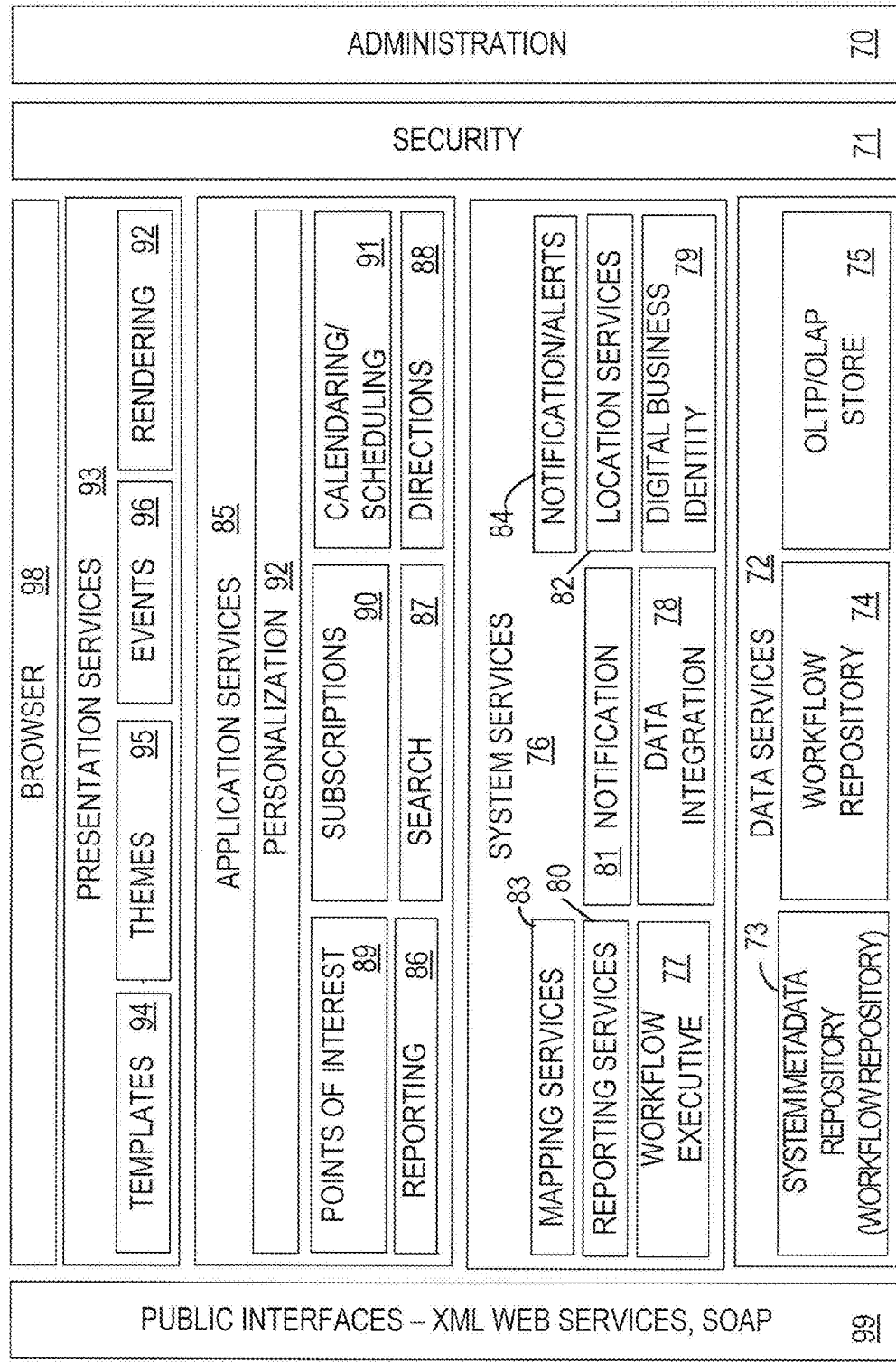
FIG. 3 illustrates a block diagram of functional architecture an exemplary administrative hub portal server, according to an implementation of the innovations herein.

FIG. 3 shows a similar logical architecture of an administrative hub portal server 12 which once more has standard administrative 70, security 71 and interface 99 modules. The principal functionality of portal server 12 may be divided into data services 72, system services 76, application services 85 and a browser 98. Data services 72 principally comprise a repository for data needed to reply to inquiries from users accessing the system using their web client 16 (shown in FIG. 1).

Principal components of data services 72 include system metadata repository 73 holding information with respect to the system components so that they may be accessed when needed to carry out actions; workflow repository 74 queuing the actions to be carried out; and OLTP/OLAP storage 75. System services provide a number of modules corresponding to core services on the application server including reporting services 80, notification alerts 84, and location services 82. In addition, system services provide mapping services 83 for rendering locations on graphical maps, workflow executive 72 for parsing actions in the workflow repository 74 and commencing execution of those actions, data integration 78 for merging structured and unstructured data into a useful form such as XML for use by the system, and digital business identity 79 for holding user management information utilized by the system's access control logic. The application services 85 include display related personalization 92; search functionality 87; reporting 86; points of interest 89 for assigning descriptive names to physical locations in lieu of addresses; subscriptions 90 for allowing users to specify types of information to receive, such as whenever a new subscriber or offender is added for monitoring, whenever a mobile unit is disabled, or other types of events separate from the violation type notification/alerts; directions 88 for facilitating navigation to locations; and calendaring/scheduling 91 to communicate schedule information with scheduling services 53 on application server 11. Presentation services 93, principally comprising templates 94, themes 95, and rendering 97, provide for enhanced screen displays presented in browser 98. Events 96 translates user keystrokes and mouse clicks into workflow actions.

Figure 4:
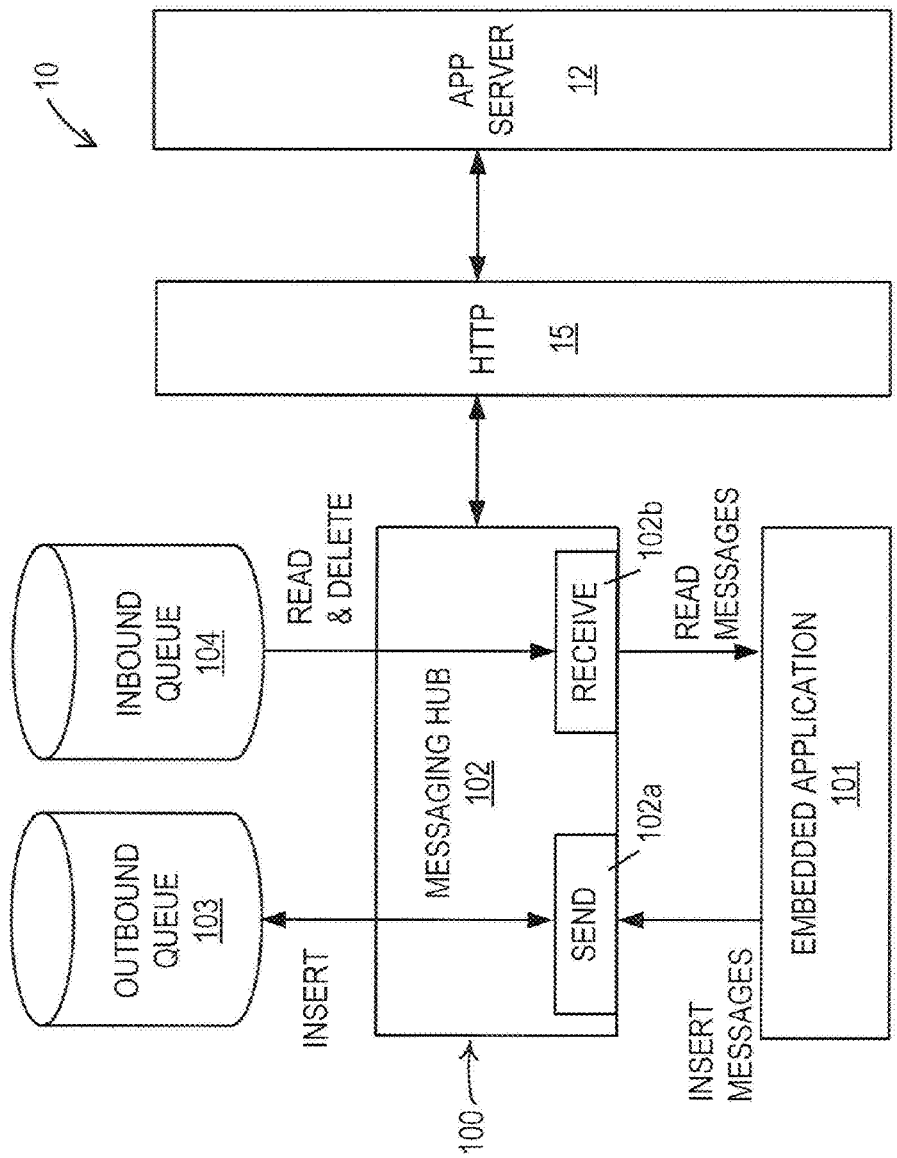
FIG. 4 illustrates a diagram showing a process flow of exemplary communications associated with a portable device, according to an implementation of the innovations herein.

FIG. 4 shows an overview of messaging between application hub 10 and user device 100. A message may be generated by application server 12 and then communicated via Internet and typically public cellular network 15 to device 100 where it is inserted in the inbound message queue 104. Messages are then read into the messaging hub 102 which corresponds to communication services 114 shown in FIG. 5 and deleted from the inbound queue 104. Received messages are then processed for message type and appropriate message data is transmitted to embedded application 101 in the device 100. Similarly, the embedded application 101 may generate acknowledgement for messages which are transmitted to messaging hub 102, formatted and inserted in outbound message queue 103.

Figure 5:
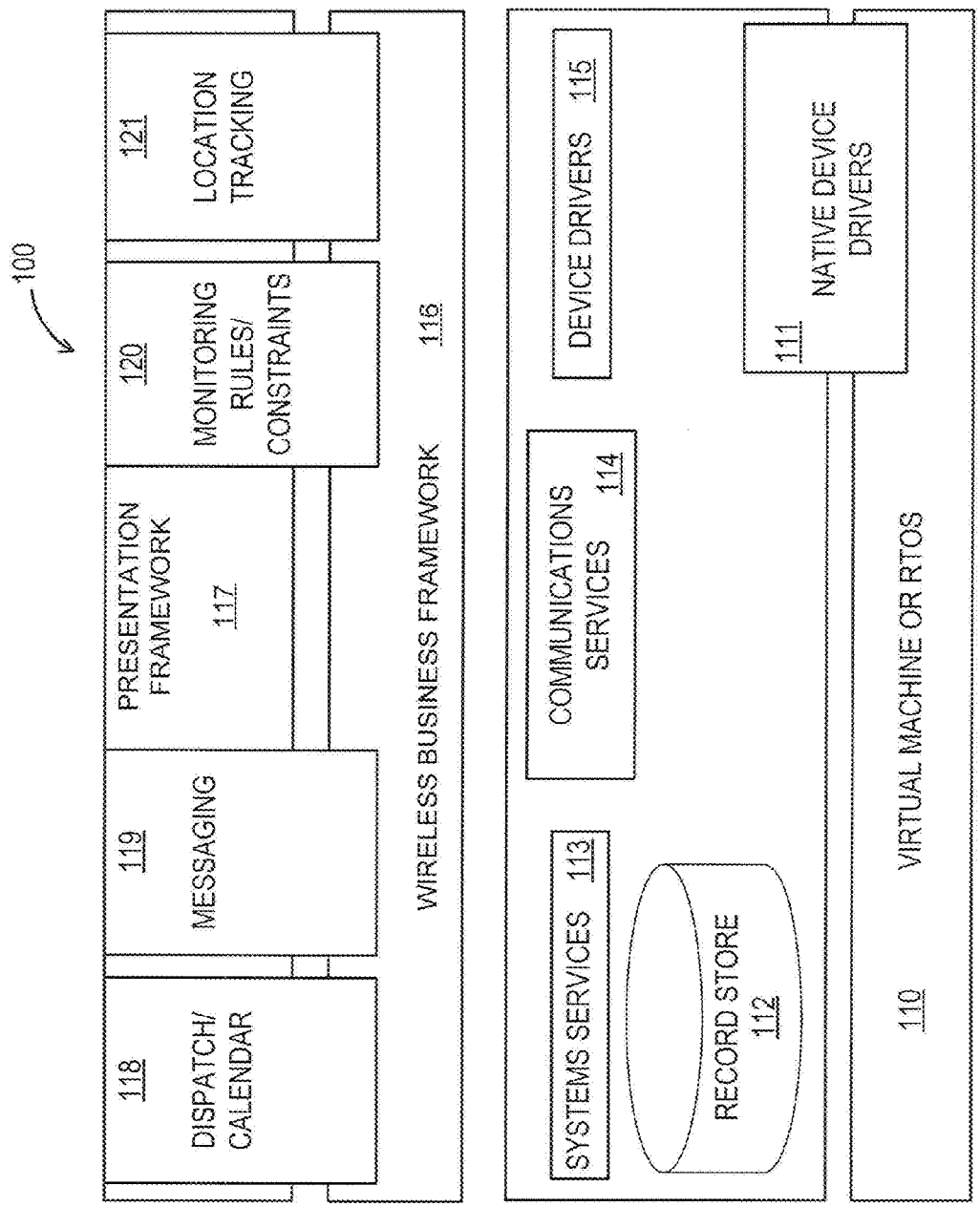
FIG. 5 illustrates a block diagram showing exemplary functional architecture of a tracking device, according to an implementation of the innovations herein.

The logical architecture of a representative device utilized consistent with the innovations herein is reflected in FIG. 5. A preferred device uses a real time operating system (RTOS) or a virtual machine software implementation of a desired CPU and native device drivers 11 to permit operation of the system with a wide variety of devices 100. In even the more basic tracking devices typified by vehicle tracking 27 or offender tracking 26 devices, there are device drivers 115 to interface with much of the hardware shown in FIG. 6, systems services 113 to monitor device status 112 or to generate alerts, and communication services 114 to transmit stored data and alerts. Wireless business framework 116 implements the confirmed delivery of messages, while presentation framework 117 contains dispatch module 118, which effectively is a calendaring or scheduling functionality, and messaging 119 which is only available on more advanced devices such as handhelds, phones with LED displays, or computers. Monitoring rules and constraints 120 are implemented to generate active monitoring notifications while location tracking 121 generates GPS and assisted GPS location data.

Figure 6:
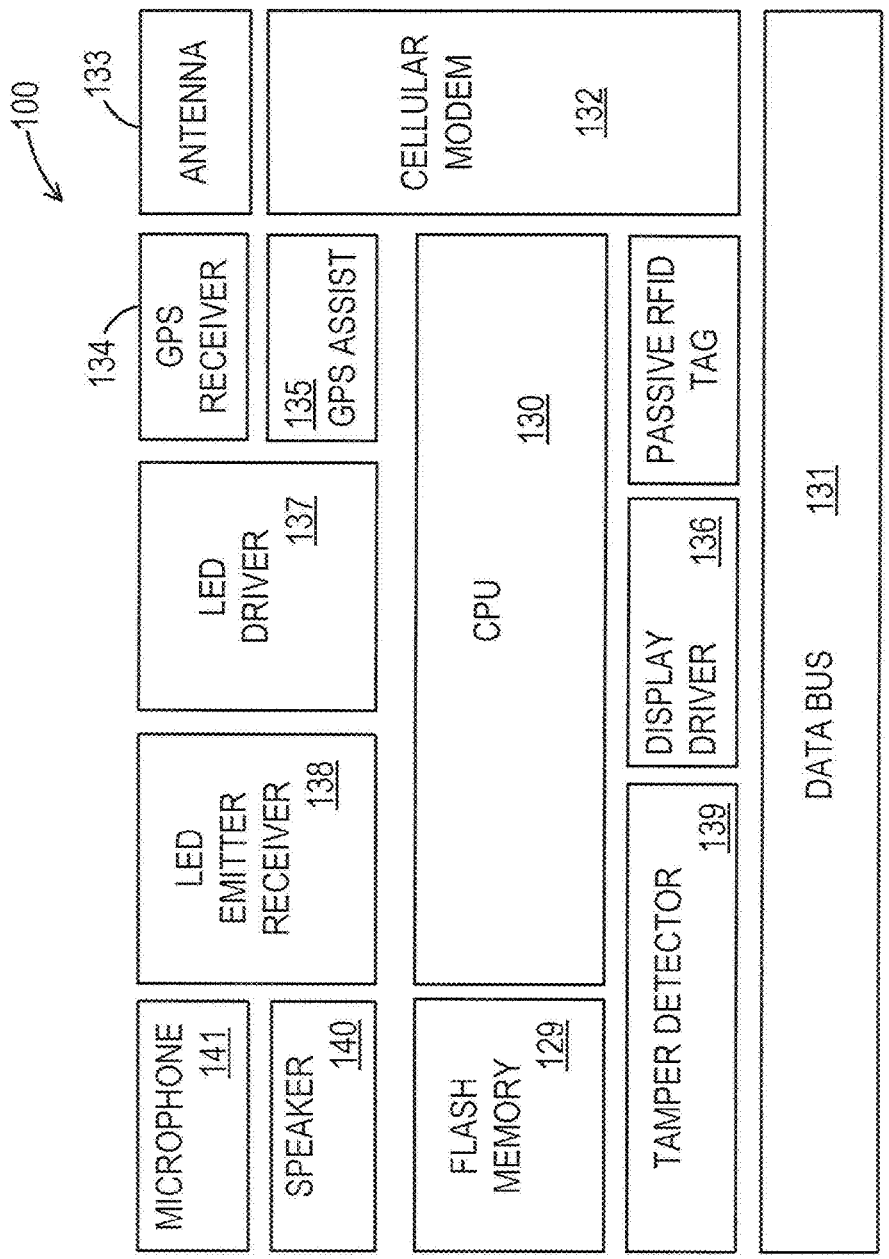
FIG. 6 illustrates a block diagram of an exemplary tracking device, according to an implementation of the innovations herein.

FIG. 6 is a high level block diagram of a device 100 used consistent with the innovations herein. Typically, the device is based upon a GPS enabled cell phone, principal components of which are flash memory 129, CPU 130, data bus 131, cellular modem 132, antenna 133, GPS receiver 134, display driver 136, speaker 140, and microphone 141. The operating system or virtual machine software, as appropriate to the device, may be installed in flash memory 129 and operates in connection with CPU 130 to present a standard device profile to the system. Communications are transmitted from the CPU through the data bus 131 to cellular modem 132 and broadcast in the form of digital packets via antenna 133. Similarly, incoming messages travel in the reverse sequence.

The GPS receiver 134 is one exemplary component that may be utilized to generate location information. Because GPS location requires line of sight access to GPS satellites 17, and because GPS location is sometimes subject to erroneous results due to drift or temporary satellite misorientation, GPS assist 135 may be added to the device or the cellular network. Assisted GPS generates location information based upon signals received from nearby cellular communication towers 18 and without correction is often only accurate to within several hundred feet rather than the GPS location accuracy of only several feet. Nonetheless, assisted GPS may provide valuable location confirming information as well as at least general location information when line of sight access to GPS satellites is unavailable.

Alternatively, location information may be provided by a location aggregator. The location aggregation service may be provided by a cellular network provider or an entity operating a gateway in connection with the cellular network or other broadcast communication provider. Many cellular networks are now capable of determining the location of GPS enabled cellular devices with some degree of accuracy, such as handsets that facilitate assisted GPS such as those using Qualcomm 6050 or 6250 microprocessors which permits the network to use Advanced Forward Link Triangulation (AFLT). While the 6250 microprocessor can operate autonomously to determine the co-ordinates of the device/handset, both of the Qualcomm processors can also operate in response to a cellular network query, or by generating a their own location query, to cause the network to acquire the OPS data received by the cellular handset, and to utilize Advanced Forward Link Triangulation (AFLT) or other cellular network information, to produce an assisted GPS geolocation for a device.

In a further refinement, the GPS and cellular network data may be processed by the location aggregation service for accuracy. For instance, location information data may be processed utilizing noise processing theorems to correct for bad data such as drift caused by a GPS satellite wobble, or the effects of changes in signal reflection and absorption caused by varying conditions such as locations in urban canyons, trees/forests, or beneath heavy cloud cover, and atmospheric ionization changes from day and night. Information as to the geolocation of the handset is then communicated by the location aggregator to the administrative hub, and in appropriate instances may also be communicated to the device.

While the display driver 136, microphone 141 and speaker 140 may be disabled or removed from vehicle location 27 or offender bracelet 26 constructions, other hardware may be added. For instance, in the case of an offender bracelet 26, tamper detector 139 and LED driver 137 and LED emitter receiver 138 are added to provide redundant tamper indicators as explained below in connection with FIGS. 8A-8F.

A system similar to that described above is disclosed in U.S. patent application publication No. 2008/0108370A1, published May 8, 2008, the entire contents of which are incorporated herein by reference.

Figure 7A:
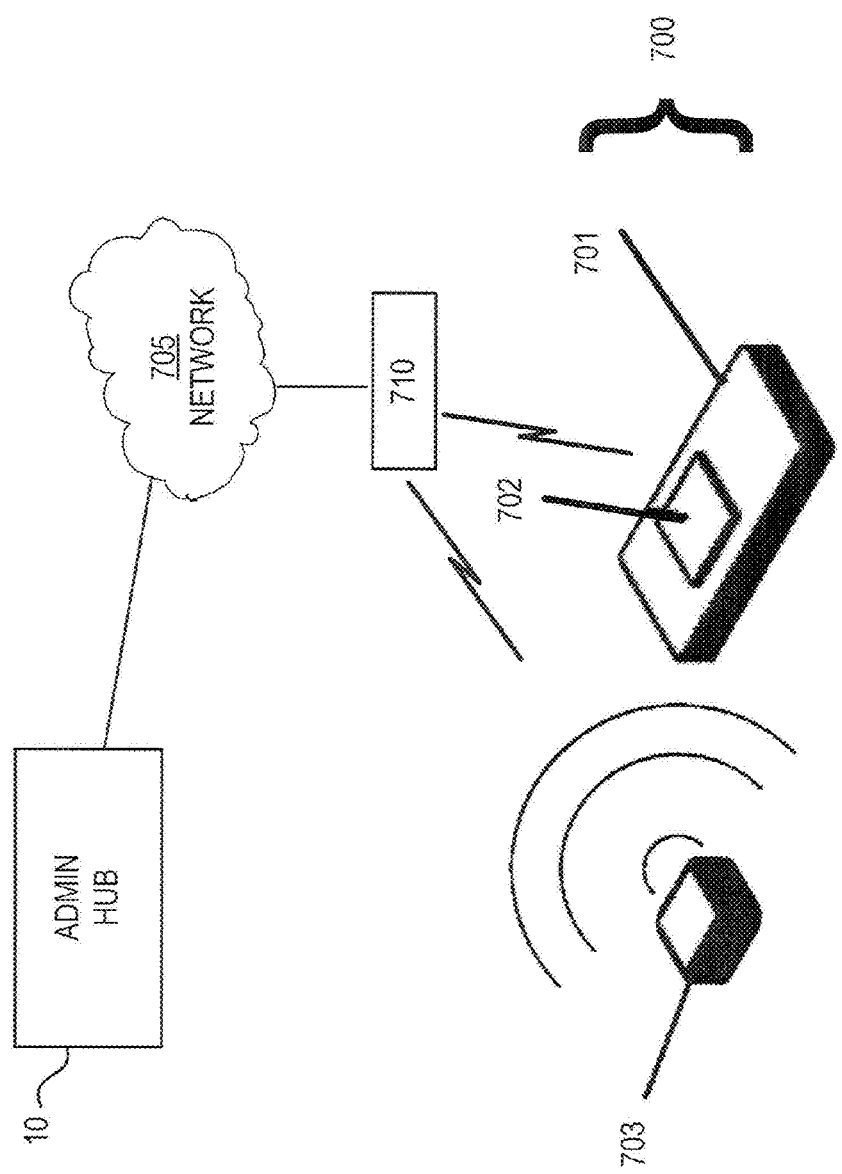
FIG. 7A illustrates an exemplary system including a tracking device with a wireless power receiving device, according to an implementation of the innovations herein.

FIG. 7A illustrates an exemplary tracking system including a tracking device with a wireless power receiving device. In FIG. 7A, an example embodiment is given where a tracking assembly, including a tracking device 701 and a wireless power receiving device 702, is being powered and/or charged by a wireless energy transmitting device 703. The system may also include a administrative hub, to which data regarding tracking may be transmitted from the tracking device 701 via intermediate components 710 and/or networks 705. According to some implementations, close physical proximity between the wireless energy transmitter and receiver is not needed, so the wireless energy transmission device 703 may be located, e.g., several meters away. In implementations where charging is provided via the wireless power receiving device 702, a battery and wireless charger (not shown) are included within the tracking device 701. These wireless battery charging implementations negate the need for traditional (electrical cord type) charging. However, tracking devices with the wireless energy transfer features set forth herein may be used without relying on the batteries or concerns of charged batteries, as the wireless power receiving device may simply provide all the power needed by the tracking device circuitry.

Moreover, the tracking device 701 may have first and second modes related to determination of location of the device, the device entering the second mode of operation in response to a predetermined condition. For example, the tracking device may operate in a regular (stand-by) mode of operation, it may operate in modes of operation where it uploads data or otherwise communicates with outside processing components, such as the administrative hub, and it may operate in alarm modes, where external resources are alerted to emergency situations and data such as location information is transmitted continuously or at very frequent intervals. Examples of predetermined conditions that can cause a switch between modes of operation are conditions such as loss of power, movement of the tracking device into or out of specific zones or areas, tilting of the device, shock or sudden movement of the device, movement of the device out of range of the wireless power, and/or other conditions set forth herein. Additional information regarding the modes of operation and communication processing related thereto are set forth below in connection with FIG. 20.

Figure 7B:
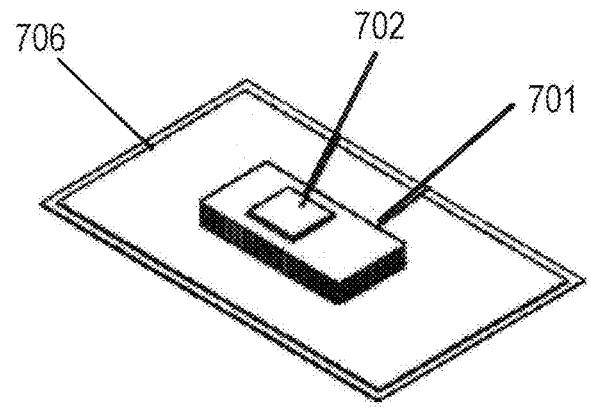
FIG. 7B illustrates a tracking device with a wireless power receiving device and a wireless energy transmitting device in close proximity, according to an implementation of the innovations herein.

FIG. 7B illustrates a tracking device 701 with a wireless power receiving device 702 and a wireless energy transmitting device 706 in close proximity, according to the first embodiment of the innovations herein. Referring to FIG. 7B, the wireless energy transmitting device 706 be placed in close proximity and may take a shape that is suitable for deployment near the tracking device, such as a mat 706 placed under the tracking device 701. Here, the power transmitter may also be configured to transmit power within a specified range.

Figure 7C:
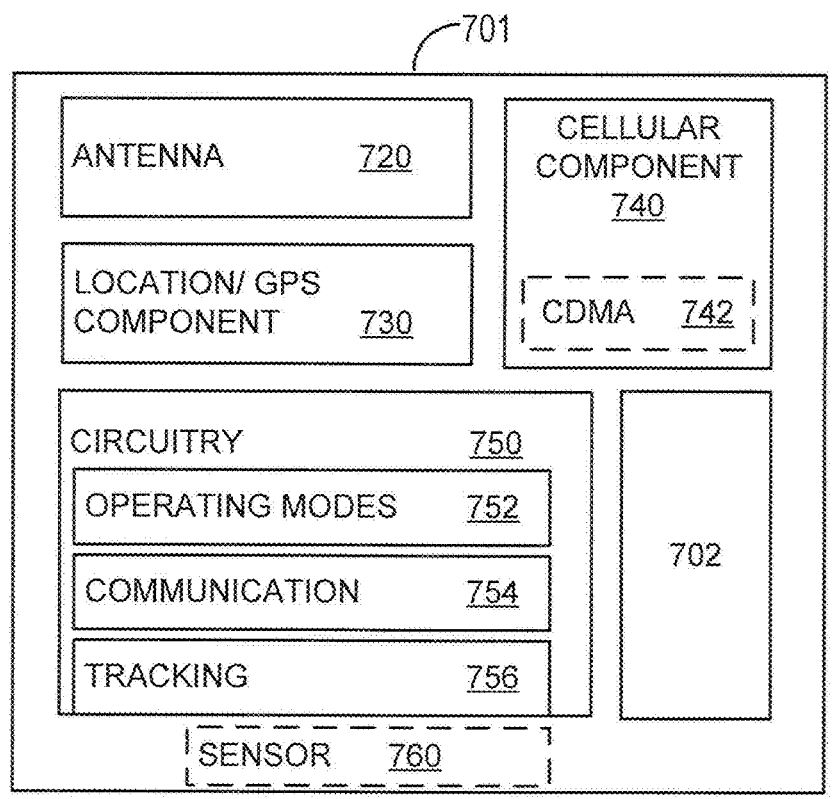
FIG. 7C illustrates a block diagram of an exemplary tracking device, according to an implementation of the innovations herein.

FIG. 7C illustrates a block diagram of an exemplary tracking device. According to FIG. 7C, a wireless tracking device 701 may comprise an antenna 720, a cellular component 740 such as a cellular modem or other transceiver that uses RF radiation to provide positional information regarding the tracking device, and circuitry 750 and/or processing component(s) including an operation module 752, a communication module 754, and a tracking module 756. Optionally, the tracking device 701 may also include a location or GPS component 730, a CDMA subcomponent 742 in connection with the cellular component 740, and one or more sensors 760. Further, the tracking device 701 may also include a power receiving device 702 that is internal or external to the tracking device structure itself.

Additionally, tracking devices consistent with the innovations herein may also include a motion sensor and/or acceleration sensor that indicates when the device is moved, wherein the second mode includes commencement of an automatic tracking process and the predetermined condition includes indication, by the motion sensor and/or acceleration sensor, that the device has been moved.

Figure 9:
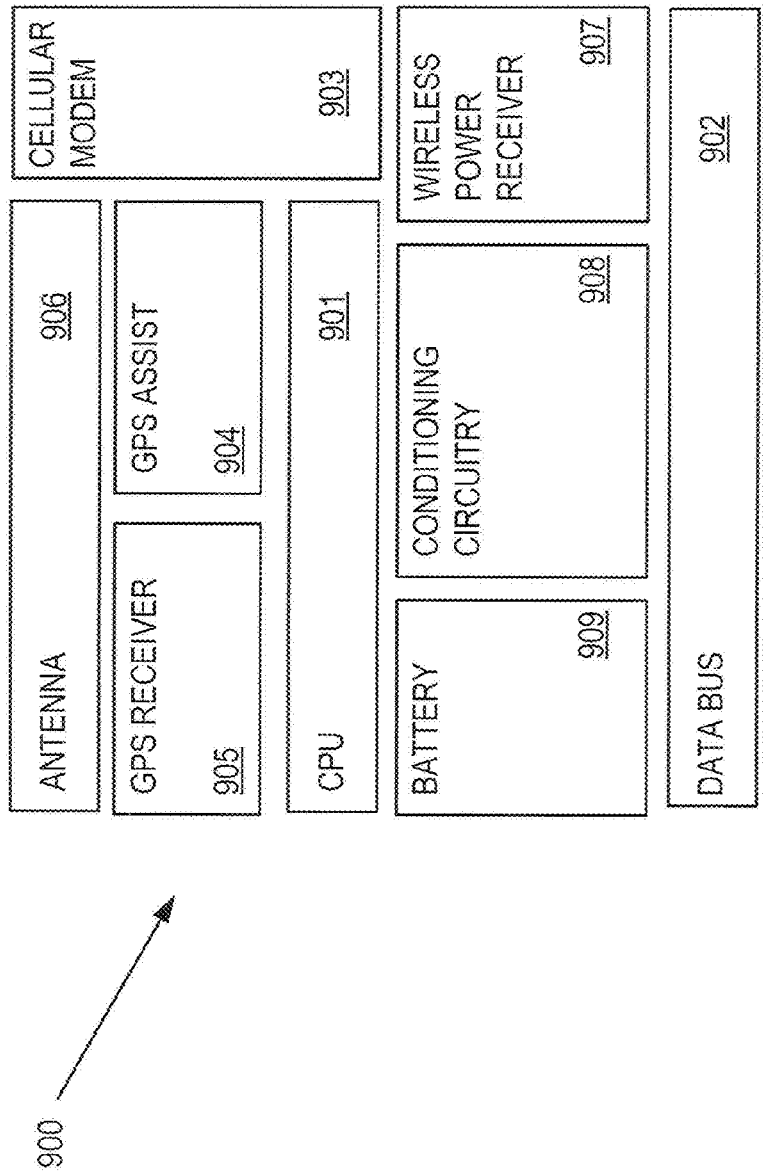
FIG. 9 illustrates a block diagram of a wirelessly charged tracking device, according to an implementation of the innovations herein.

FIG. 9 illustrates a block diagram of a wirelessly charged tracking device 900 consistent with the embodiments illustrated in FIGS. 6 and 7C, but providing wireless charging. Referring to FIG. 9, an exemplary tracking device 900 may be comprised of one or more of a CPU 901, a data bus 902, a cellular modem 903, a GPS receiver 905, GPS assist 904, an antenna 906, conditioning circuitry 908 and a battery 909. A wireless power receiver 907 is also shown as being an internal component of the tracking device 900, though it may also be external to the device. Communications may be transmitted from the CPU through the data bus to the cellular modem and broadcast in the form of digital packets via the antenna 906. Similarly, incoming messages travel in the reverse sequence.

In some implementations, circuitry 908 may include conditioning circuitry which receives energy from power receiver 907 and provides the correct voltage and current to charge battery 909. Further, circuitry 908 may also include routing circuitry to route the energy from battery 909 to various components of tracking device 900 such as CPU 901, cellular modem 903, GPS receiver 905 and/or GPS assist 904.

In each refinement and description of the tracking device above, the addition of the wireless power receiver allows the implementations of the innovations herein to charge wirelessly with wireless energy transfer technology.

Figure 10:
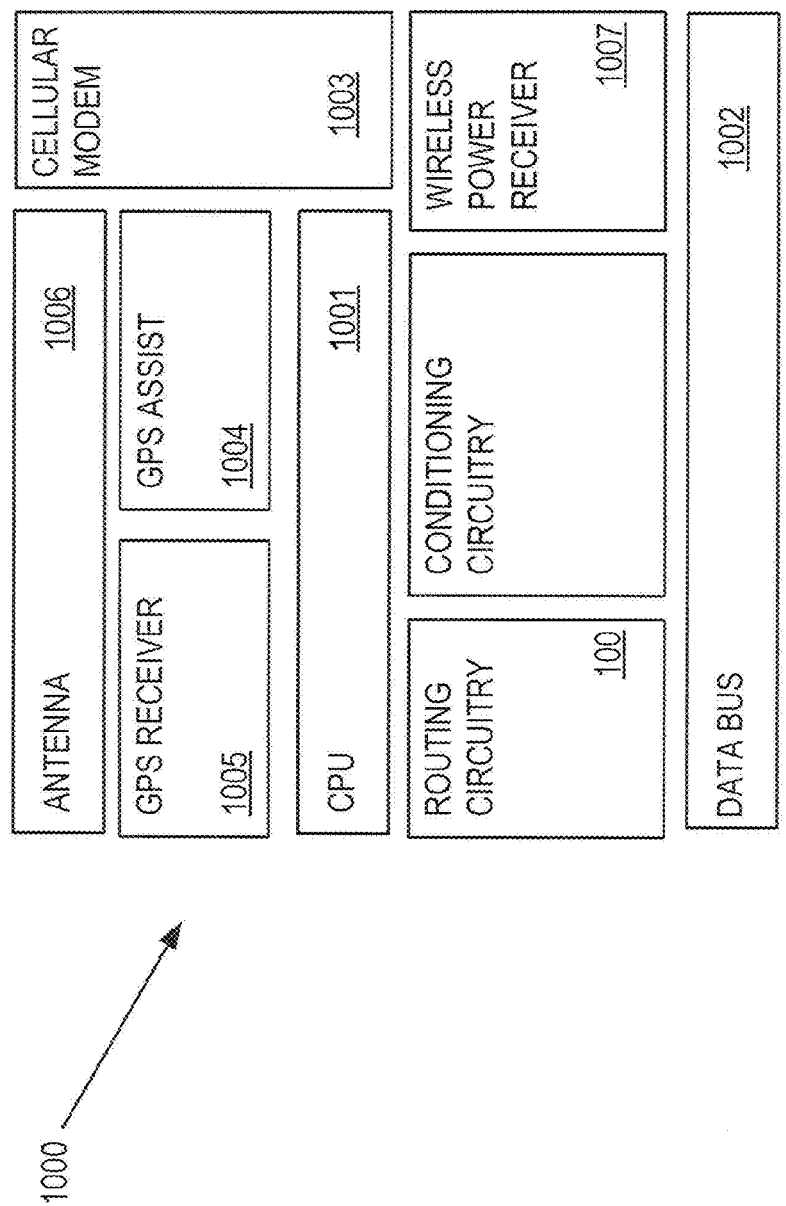
FIG. 10 illustrates a block diagram of a wirelessly charged and/or wirelessly powered tracking device, according to an implementation of the innovations herein.

FIG. 10 illustrates a block diagram of a wirelessly powered tracking device 1000 consistent with the embodiments illustrated in FIGS. 6 and 7C, but providing wireless powering. The implementation illustrated in FIG. 10 uses wireless energy transfer technology to power the device with this power. This embodiment is similar to the device described in FIG. 9 with an exemplary device being comprised of one or more of a CPU 1001, a data bus 1002, a cellular modem 1003, a GPS receiver 1005, GPS assist 1004, an antenna 1006, circuitry 1008, power routing circuitry 1009 and a battery 1010. A wireless power receiver 1007 is also shown here within the tracking device, though may not be integral therewith.

In some implementations, power receiver 1007 may provides energy to conditioning circuitry 1008 which may then provide the correct current and voltage to power tracking device 1000. Further, routing circuitry 1009 may be included to route energy from conditioning circuitry 1008 to various components of the tracking device 1000 such as CPU 1001, cellular modem 1003, GPS receiver 1005 and/or GPS assist 1004.

Figure 11:
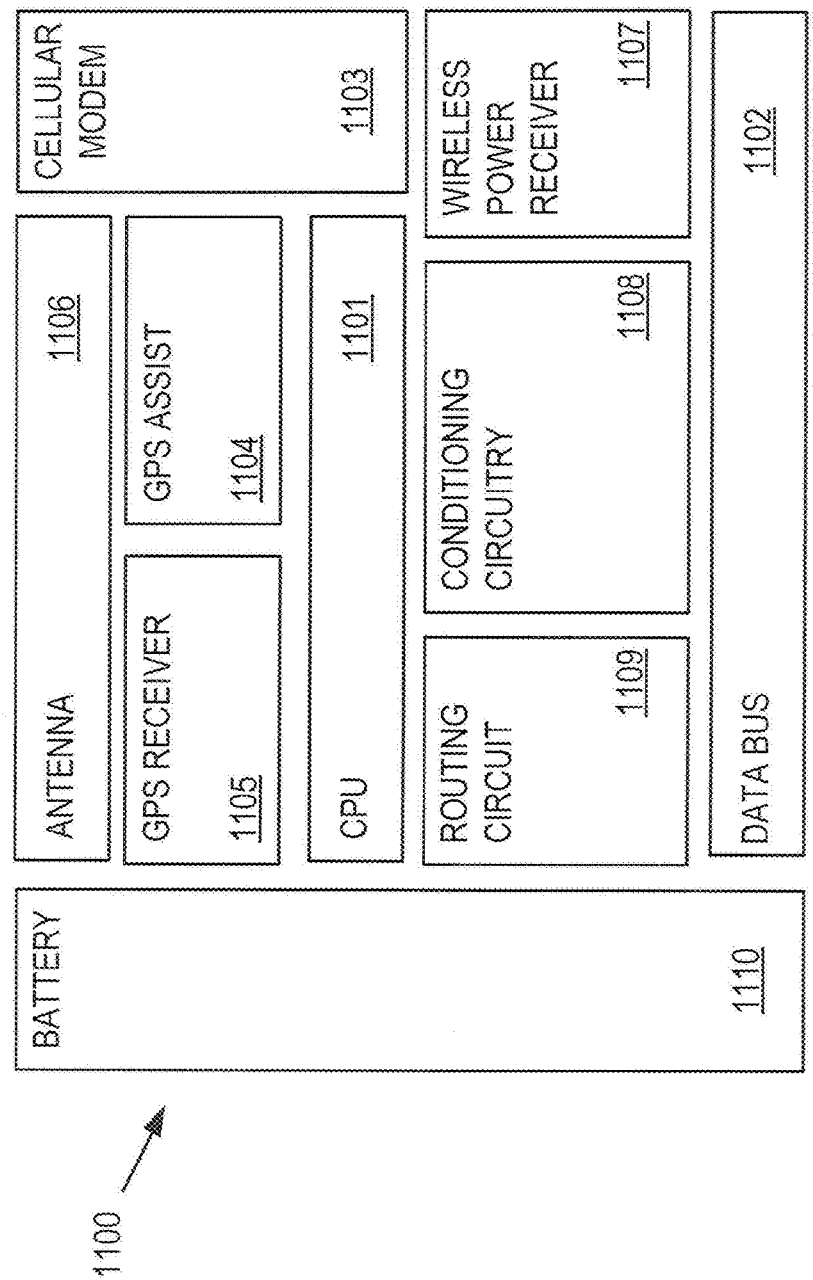
FIG. 11 illustrates a block diagram of a wirelessly powered tracking device, according to an implementation of the innovations herein.

FIG. 11 illustrates a block diagram of a wirelessly charged and/or wirelessly powered tracking device 1100, consistent with the embodiments illustrated in FIGS. 6 and 7C, but providing wireless charging/powering. Innovations consistent with the illustrated implementation use wireless energy transfer technology to charge and/or power the device so that the device does not need to rely on a separate battery for use. This implementation is similar to the device described in FIG. 10 with the tracking device being comprised of one or more of a CPU 1101, a data bus 1102, a cellular modem 1103, a GPS receiver 1105, GPS assist 1104, an antenna 1106, circuitry 1108 and power routing circuitry 1109. As with FIGS. 9 and 10, the wireless power receiver 1107 is shown within the tracking device. Battery 1110 is also provided in this embodiment.

In some implementations, power receiver 1107 may provide energy to conditioning circuitry 1108 which provides the correct current and voltage to power tracking device 1100 and to charge battery 1110. Further, routing circuitry 1109 may route energy from conditioning circuitry 1108 to battery 1110 and to various components of tracking device 1100 such as CPU 1101, cellular modem 1103, GPS receiver 1105 and/or GPS assist 1104.

Tracking functionality of implementations consistent with FIG. 11 may continue to operate as described in FIG. 10, whereas one difference is in how the device is powered for operation. The implementation of FIG. 11 receives power wirelessly and powers the device with no need for battery power. The electricity obtained wirelessly in the innovations herein may be routed to the tracker components and the tracker is able to obtain a location.

In some implementations, the tracking device may be configured to be constantly powered during operation and may further comprise monitoring circuitry configured for regular or continuous performance of health/status checks related to the device and/or continuous processing of status reports suitable for periodic transmission to the administrative hub. Further, the tracking device may be configured to be constantly powered during operation such that the device is capable of providing immediate information regarding the device, including the location, without any delay associated with power up.

Figure 12:
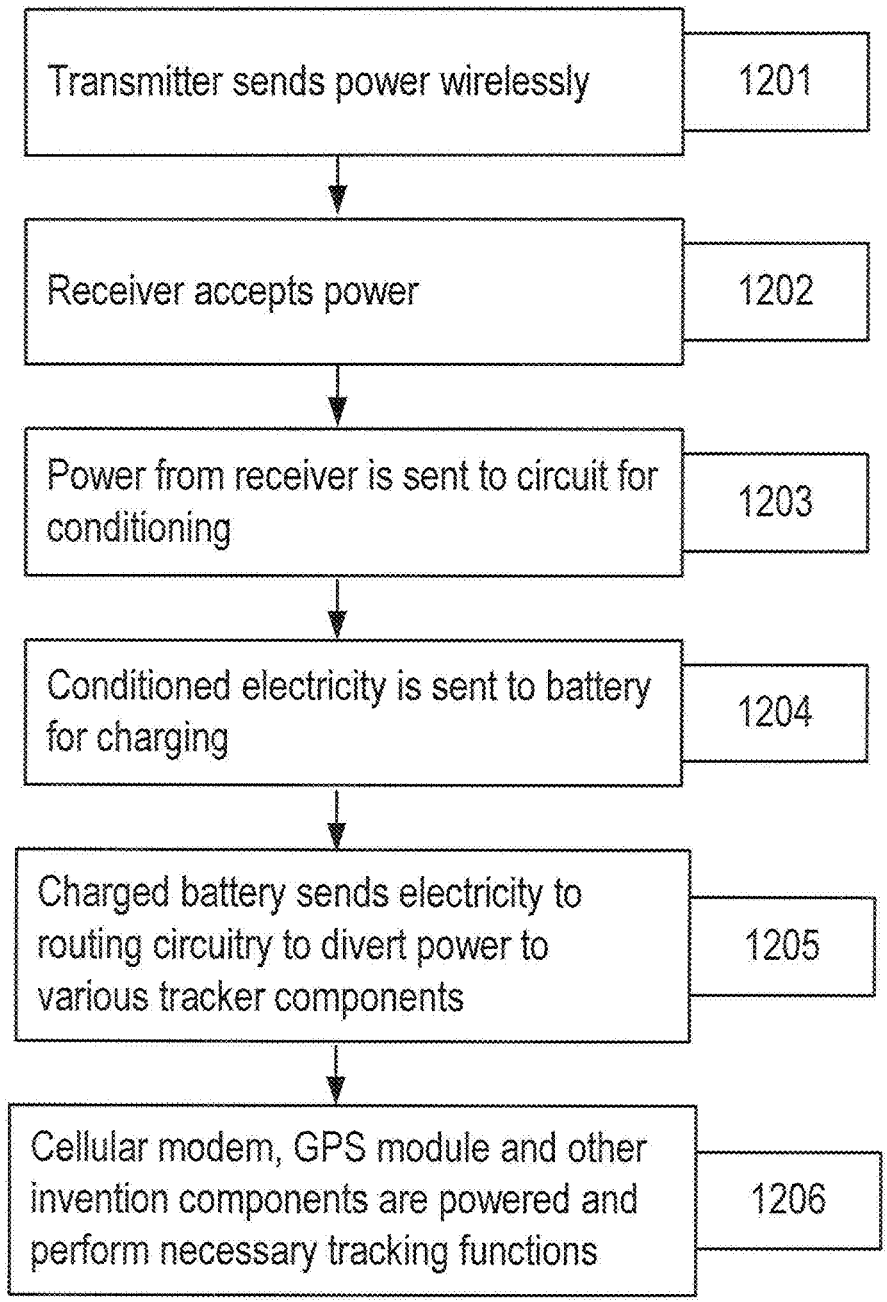
FIGS. 12-14 illustrate exemplary methods of operating tracking devices, according to an implementation of the innovations herein.
Figure 13:
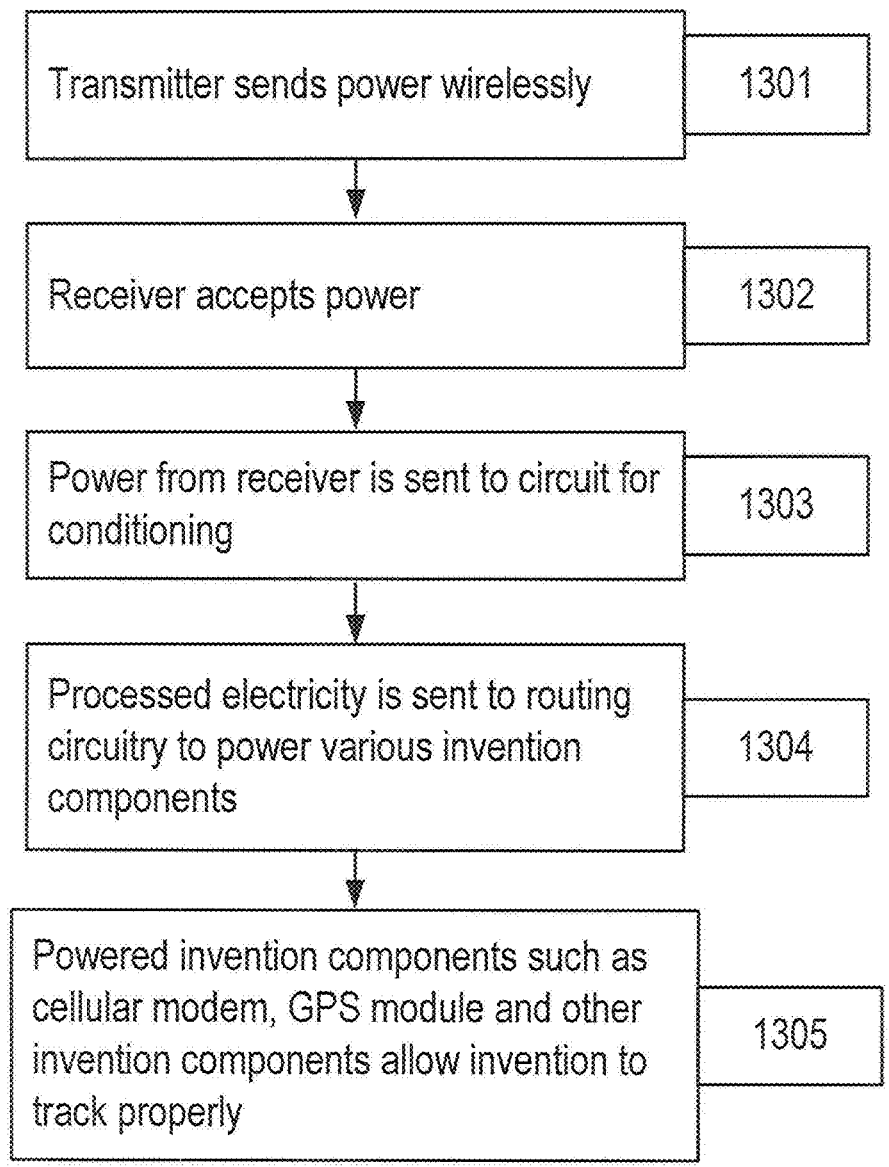
Figure 14:
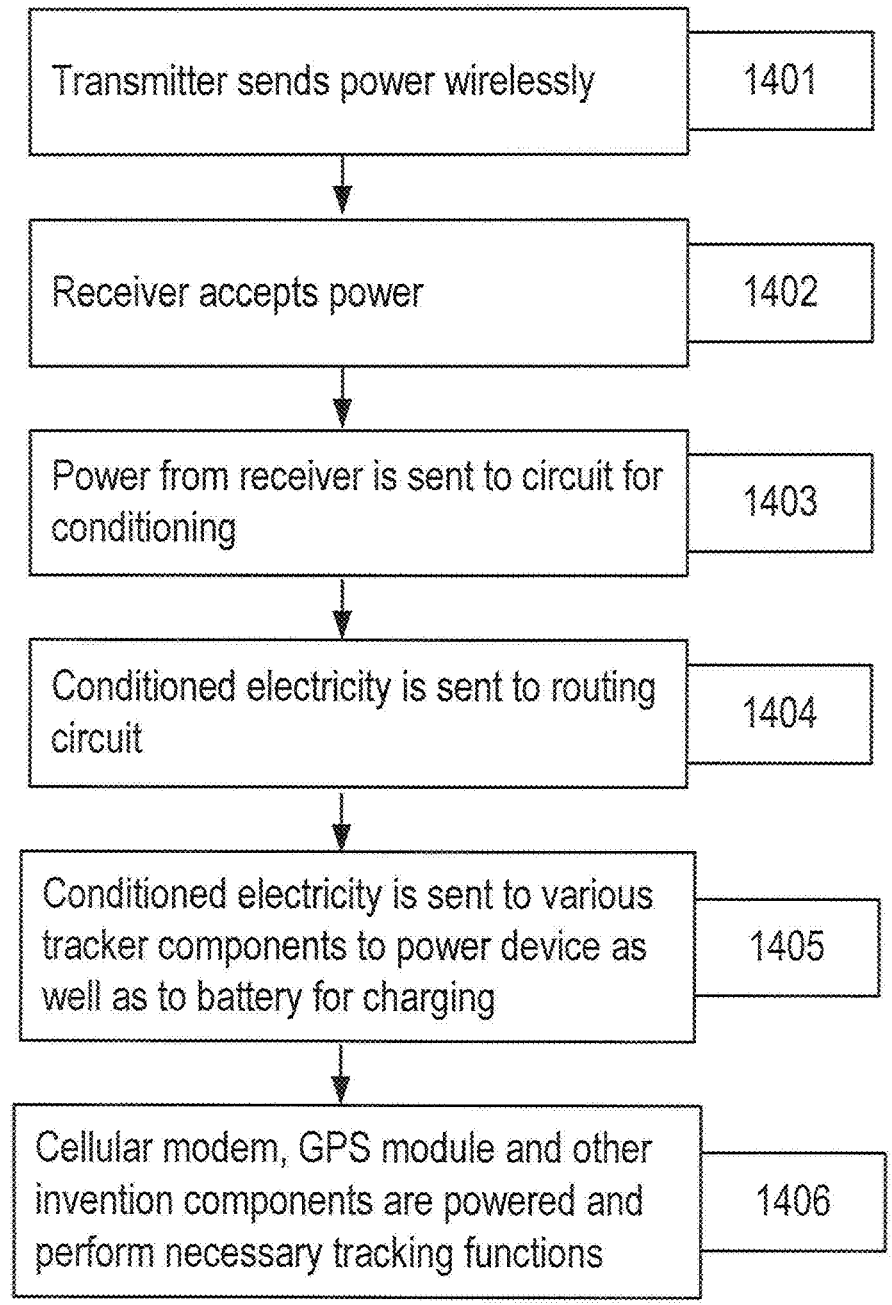

In accordance with the systems, components and features set forth above, there exist various methods of operation and/or tracking consistent with the present disclosure. FIGS. 12-14, for example, illustrate methods of operating tracking devices consistent with the first embodiment of the innovations herein.

FIG. 12 is a flowchart illustrating an exemplary method of how a wirelessly charged tracking device would receive power and operate, according to the innovations herein. At 1201 of FIG. 12, a wireless power transmitting device transfers power wirelessly. A wireless receiver then receives power as shown at 1202. Power from the receiving device may then be sent to a conditioning circuit as shown at 1203, where the electricity is then converted to the correct voltage and current for use in the tracking device. At 1204, the conditioned electricity is sent to charge the battery and the electricity is sent to the battery for charging. The charged battery may then, at 1205, send electricity to various circuitry, such as the cellular modem, GPS elements and/or other components for powering. Finally, at 1206, the components such as the cellular modem, GPS components and other tracking components may then be powered to perform, e.g., the necessary tracking functions of the tracking device.

FIG. 13 is a flowchart illustrating another exemplary method of receiving power and operating a tracking device, according to the innovations herein. At 1301 of FIG. 13, a wireless power transmitting device transfers power wirelessly. At 1302, a receiver then receives power. Power from the receiving device is then sent to a conditioning circuit, at 1303, where the electricity is then converted to the correct voltage and current for use in the tracking device. At 1304, the conditioned electricity is sent to routing circuitry. The conditioned electricity from 1304 may then be sent by routing circuitry to power the various components of the tracking device such as the cellular modem, the GPS elements, etc at 1305, which avoids the need of drawing electricity directly from a battery. As such, these powered tracking components (e.g., one or more of the cellular modem, the GPS elements and other components, etc.) are now able to use this electricity and directly carry out their functionality and tracking features.

FIG. 14 is a flowchart illustrating an exemplary method of receiving power and operating a wirelessly powered and charged tracking device, according to the innovations herein. At 1401 of FIG. 14, a wireless power transmitting device transfers power wirelessly. A receiver may then receives power as shown at 1402. Power from the receiving device is then sent to a conditioning circuit as shown at 1403, where the electricity is then converted to the correct voltage and current for use in the tracking device. At 1404, the conditioned electricity is sent directly to the device circuitry, where the electricity may be diverted to implementations using wireless charging or implementations powered by wireless power transmission. At 1405, the device uses the wireless energy to charge the battery with electricity also being sent to circuit components (e.g., one or more of the cellular modem, GPS elements, other components, etc.) which are then powered and able to perform the necessary functionality and tracking features of the device, as reflected at 1406.

Several specific implementations of the innovations set forth herein are described below. For example, FIGS. 8A-8F relate to monitoring devices for individuals, FIGS. 15-17 relate to tracking devices in the context of bank bundles, and FIG. 19 relates to tracking devices in the context of ATM machines. However, the present disclosure may also be utilized in other implementations that provide the innovations herein. In further implementations, the present tracking devices with wireless charging/powering features may be associated with other objects, including containers. Here, for example, wirelessly-powered tracking devices may be affixed to shipping containers, such as containers that are shipped by semi-trailer, boat, airplane, rail, or other means. In these implementations, the vehicle (truck, etc.) may have the charging component, while the shipping container (or trailer, etc.) may have the wirelessly powered tracking device. During regular or dormant shipping phases, the system operates in the stand-by mode. However, when certain conditions occur (the container or trailer is removed, e.g., from the truck, etc.) or an operator desires a status check or otherwise wants to know what's happening, the system may enter a suitable mode, such as a mode to begin tracking, a mode to obtain a status check, etc. Moreover, these systems may enter into all of the various modes at any time, because the device is "on" while being powered.

In general, wireless tracking devices consistent with the innovations herein may be adapted for physical association with an individual or object, such as being affixed to an offender by bracelet or anklet for monitoring the offender. An exemplary offender tracking device 26 is illustrated in FIGS. 8A-8F. An exemplary tracking device 26, here, may comprise a lock bracket 144 as shown in isolation in FIG. 8F, a strap 150 shown in isolation in FIG. 8A, and main housing 170 shown in bottom view in FIG. 8D and top phantom view in FIG. 8B. Turning first to the strap 150 of FIG. 8A, a representative strap 150 might be manufactured from plastic molded over optical cable 151 and light guide 153. The strap will preferably have a light guide/connector 152, apertures 154 to accept fasteners, and apertures 155 to receive locking posts. An alternative strap design includes a flexible battery within the strap. Optical cable 151 may still be included in the strap 150, and significant power resources for the device can be located within the strap. This results in the main housing 170 no longer having to contain the entire power supply, and by utilizing a smaller battery within the housing, the size of the housing may be reduced, resulting in a device that is more easily worn.

An exemplary, optional battery technology that may be employed in such a strap is a thin flexible battery using NECs organic radial battery technology. Turning then to FIG. 8D, it can be seen that fasteners 156 have been received through apertures 154 of strap 150 and thereby fasten the strap 150 to bottom of main housing 170. As shown in FIG. 8B, main housing 170 may contain optional recharge connector 180, tamper sensor switch 181, optional battery 182, antenna 183, and may include one or more of the components reflected in FIGS. 6, 7C, 9, 10 and/or 11. When used without a power strap, the optional battery 182 may be a long life battery which has a life of up to approximately 21 to 30 days when used for offender monitoring in monitoring units having current efficient circuitry and antenna design, and effective power management algorithms to minimize the number and duration of transmissions from the unit and the intensiveness of calculations carried out in the mobile unit. This permits monthly visits to a probation officer with the necessity of recharging the battery by the offender only once, if at all.

When used with a power strap, the battery in the strap 150 preferably has these long lived characteristics, and the optional battery 182 within the housing 170 may be simply a short term back-up power supply, to operate the device temporarily if the power strap is damaged or disconnected. The storage in device 100 is sufficient to store messages and GPS location recordings for up to about two weeks depending upon the frequency with which GPS location readings are recorded.

The bottom of main housing 170 in FIG. 8D shows a variety of features including opening 171 for tamper sensor 181, opening 172 for recharge connector 180, rearward facing hooks 173, lens opening 174 to transmit light from a diode to the light guide connector 172 of strap 150 and forward lip 175 defining cavity 176. The side walls for cavity 176 have apertures 177 to receive locking pin 160 shown in FIG. 8C.

Figure 8E:
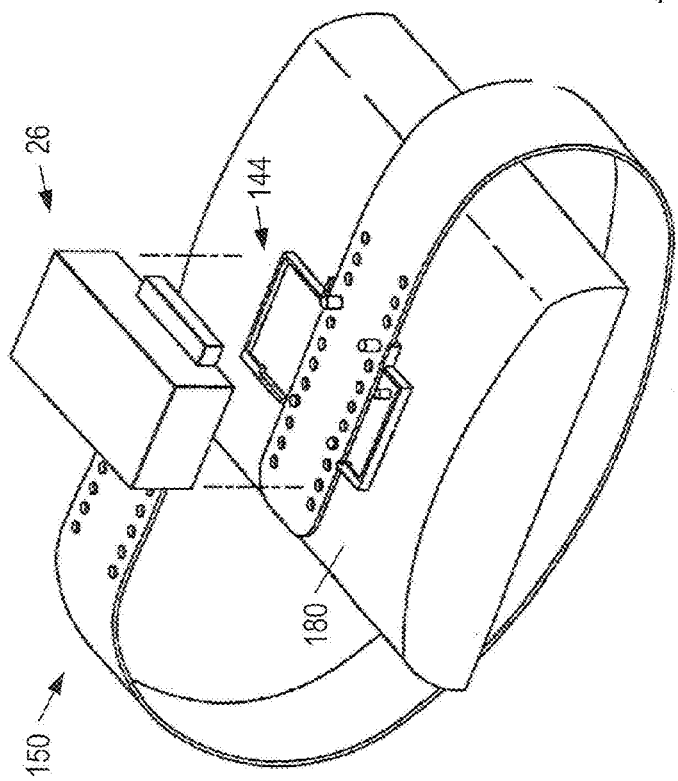
FIG. 8E is a perspective view showing the method of attaching a monitoring device to the wearer's leg, according to an implementation of the innovations herein.
Figure 8F:
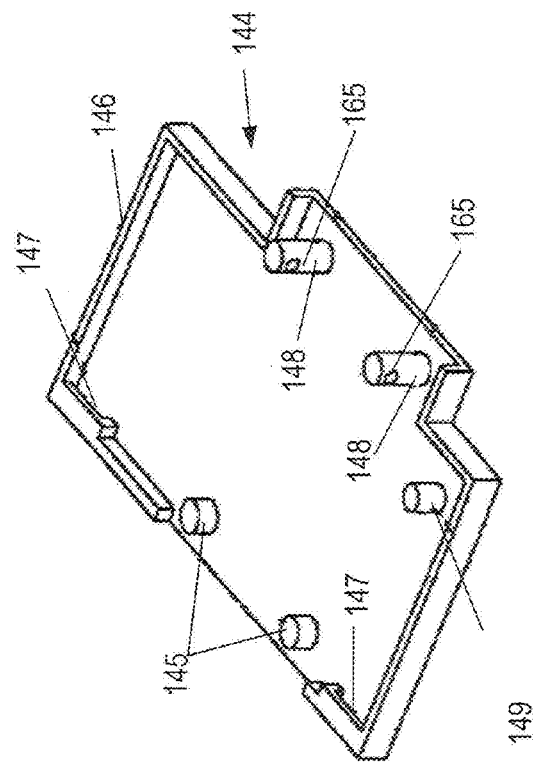
FIG. 8F is a perspective view of a lock bracket base in isolation, according to an implementation of the innovations herein.

To attach the device 26 as shown in FIG. 8E, the lock bracket 144 is placed on the offender 190. Accordingly, the bottom surface of the lock bracket 144 is preferably made with comfortable to wear surface. The top surface of lock bracket 144 has an outer flange 146 to receive housing 170 and a plurality of upstanding pins. At one end are two relatively short pins 145 that interface in the strap openings 154 that receive fasteners 156. At the opposite side of the face of lock bracket 144 are two taller pins 148 that are received in apertures 155 of strap 150 after it encircles the offender's arm or leg 190. These taller pins 148 have lateral apertures 165 to receive the locking pin 160. Also shown is pin 149 that is received in aperture 171 to activate the tamper sensor switch 181.

Thus, to fit the device 26 to the offender, lock bracket 144 is placed on the offender's leg 190. The light guide connector 152 end of the strap 150 is secured to the housing 170 as by screws 156. The strap 150 is placed so that the unattached end is received over posts 145, 148. The strap is then wrapped around the offender's leg 190, and the main housing hooks 173 are received in flange recesses 147 on lock bracket 144, while posts 148 extend upward into cavity 176. Then locking pin 160 is passed through openings 177 and pin holes 165 so that the pin head 163 extends from one side of front lip 175 and base 161 extends from the other side with lateral section 162 extending therebetween. In the event that the offender should attempt to remove the pin 160, it will break at breakpoint 164 and the tamper detector will be activated. Similarly, if the optical cable 151 of strap 150 is cut, the tamper detector will be activated. Finally, if the main housing 170 is removed from lock bracket 144, the tamper sensor switch 181 will be activated. In any of these instances, the device 26 will generate a message to the administrative hub 10 advising of the tampering event.

An effective tamper detector to ascertain whether there has been a breach of the housing 170 may combine a light sensor that is activated when light enters the housing and an electromagnetic field sensor that is activated if metal components of the housing are dislocated. A sophisticated tamper detector used with the optical cable may utilize an LED driver 137 and one or more LEDs to emit at least two different frequencies of light in alternating or random sequence through the lens opening 174 into the light guide connector 152 and outbound on a first length of optical cable 151 to light guide 152 and back inbound on the second length of optical cable 151. Simultaneously, the LED receiver is informed of the frequency being emitted, and if either no light or the wrong frequency light is detected inbound, then a tamper alert is generated.

It will be appreciated that in securing the device 26 to an offender, it is not necessary to cut strap 150. Instead, the strap will fit a substantial range of offender leg sizes and requires no special tools to secure the unit on the offender's leg. Prior art devices have generally required the strap be cut to length and in the event that optical cable is utilized for tamper indication, the difficulties of accurately splicing the cable not only requires special tools, but also is likely to be sufficiently defective that false tamper alerts may be generated. Furthermore, when the device is removed from an offender, only the pin 160 is destroyed, so that the strap 150 may be reused.

Figure 15:
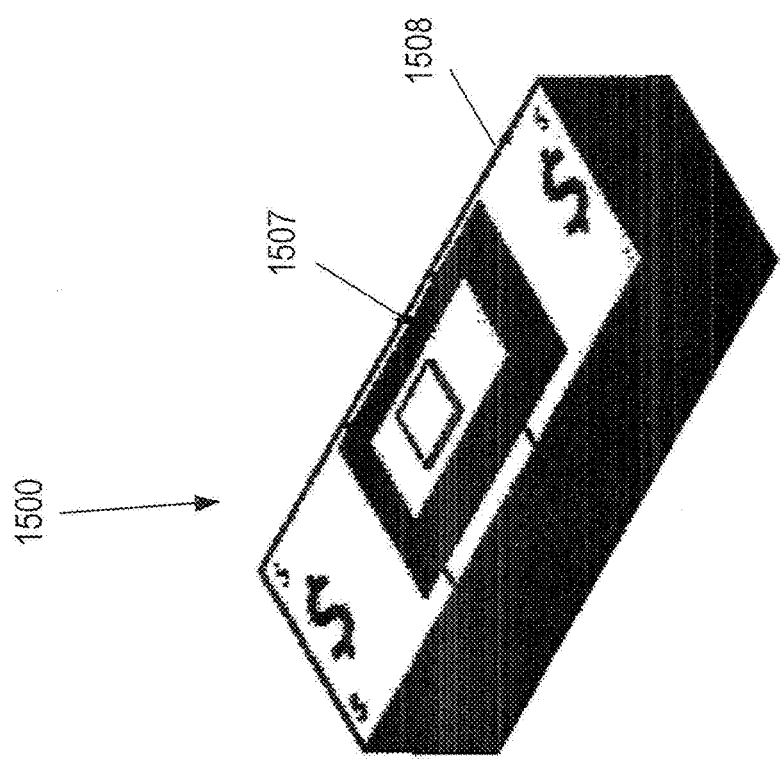
FIG. 15 illustrates an exemplary tracking device, according to an implementation of the innovations herein.

FIG. 15 illustrates an exemplary tracking assembly 1500 including a wireless tracking device 1507 with a wireless power receiving device and a bank bundle 1508. The tracking device 1507, here, may be consistent with the tracking devices disclosed elsewhere herein, such as in FIGS. 6, 7A, 7B, 7C and 9-11. Referring to FIG. 15, a tracking device 1507 may be placed inside a bank bundle 1508 that has had an interior portion removed to accommodate the tracking device 1507. An exemplary system associated with such a tracking device may also include a administrative hub, to which data regarding tracking may be transmitted from the tracking device via any communication channel known to one of ordinary skill in the art.

In systems wherein such tracking devices are placed within fake bank bill bundles, the bundle may have a same thickness as a real bank bundle. The bundle may also have a same flexibility of a real bank bundle. Further, the tracking device may be integrated into stack of paper similar in size to currency bills having a cavity for the tracking device and with real currency used to disguise the bundle.

In one exemplary implementation, a wireless tracking device 1507 integrated within a fake bank bill bundle 1508 to monitor bank bills may comprise a power receiving device that generates power from wireless energy received from a power transmitter configured to transmit the wireless energy, circuitry having first and second modes of operation related to determination of location of the device, the device entering the second mode of operation in response to a predetermined condition, and communication circuitry configured to process data related to the device for transmission to an administrative hub that is configured to monitor locations of the bundle based upon the data.

In other implementations, the bank bundle 1508 may comprise a stack of paper with the same dimensions as a bank bundle of actual currency. Further, this fake bank bundle may consist of a full stack of currency, a stack of paper with currency on the top and bottom of the stack, or any variation thereof to maintain the illusion of being an actual stack of currency. The bundle maintains flexibility and conceals the tracking device therein.

Figure 16:
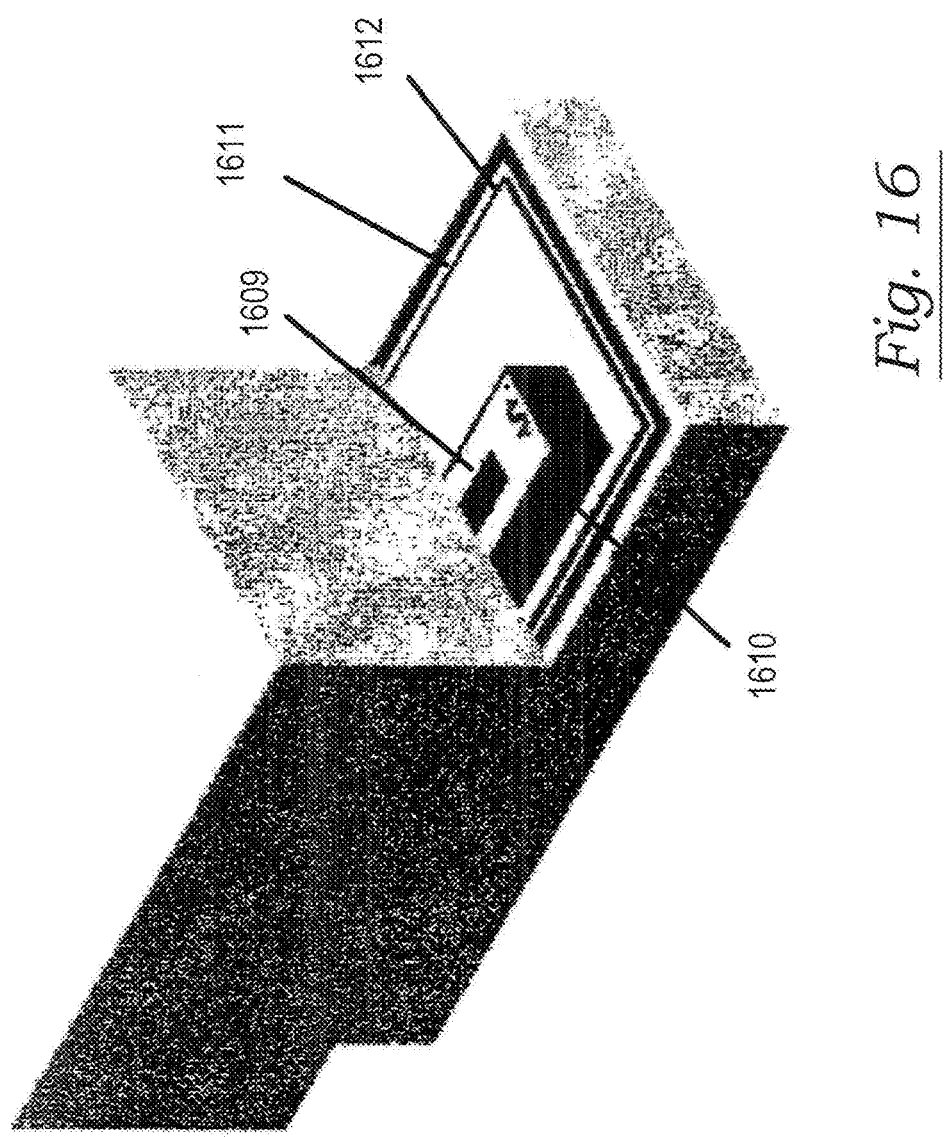
FIG. 16 illustrates an exemplary system including a tracking device, according to an implementation of the innovations herein.

FIG. 16 illustrates another implementation with a tracking device 1609 placed inside a bank bundle 1610 that has had its center removed to accommodate the tracking device 1609. The assembly may be placed in a cash drawer that has the power transmitter associated therewith, such that the device is charged while in the cash drawer. For example, the bank bundle 1610 may be placed in a cash drawer 1611 that has a power or charging mat 1612 inserted to charge the tracking device 1609. When the tracking device 1609 and bank bundle 1610 are on top of mat 1612, power is transferred to the tracking device 1609 and it is powered and/or charged. Again, the tracking device 1609, here, may be consistent with the tracking devices disclosed elsewhere herein, such as in FIGS. 6, 7A, 7B, 7C and 9-11. Further, in systems that include multiple modes of operation (e.g., alarm modes, tracking modes, etc.) based on predetermined conditions, the predetermined condition may be loss of power due to removal of the bundle from the cash drawer, wherein the triggered mode may also includes transmission of an alert to a monitoring station for appropriate action/response.

Figure 17:
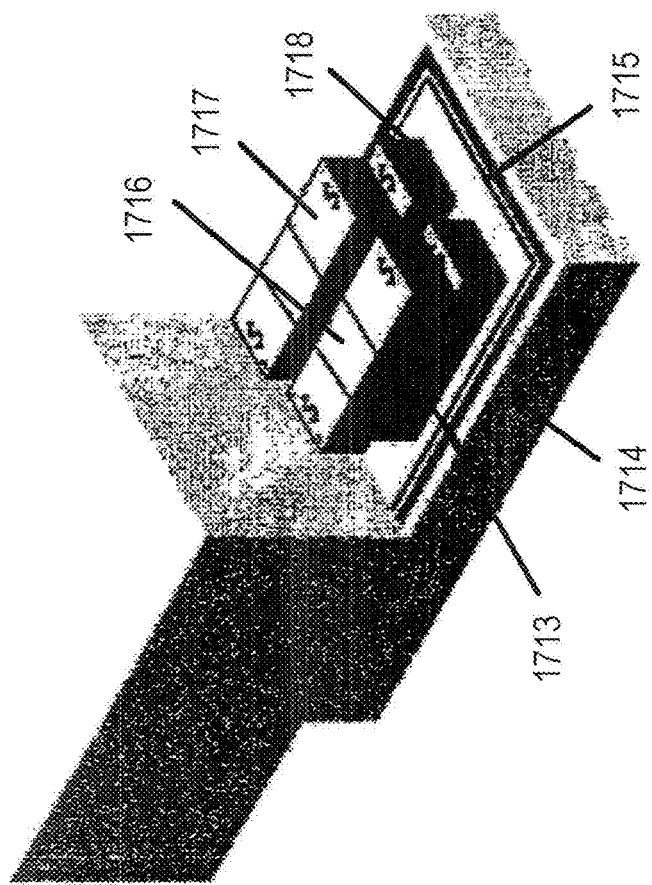
FIG. 17 illustrates another exemplary system including a tracking device, according to an implementation of the innovations herein.

FIG. 17 illustrates another implementation with a tracking bundle 1713 residing in cash drawer 2714 that has charging and/or powering mat 1715 inside. The charging and/or powering mat 1715 may power and/or charge the tracking device similar to FIG. 16. Additional bank bundles 1716, 1717, and 1718 may also reside in the cash drawer for transaction purposes and to conceal the tracking bundle 1713.

Figure 18:
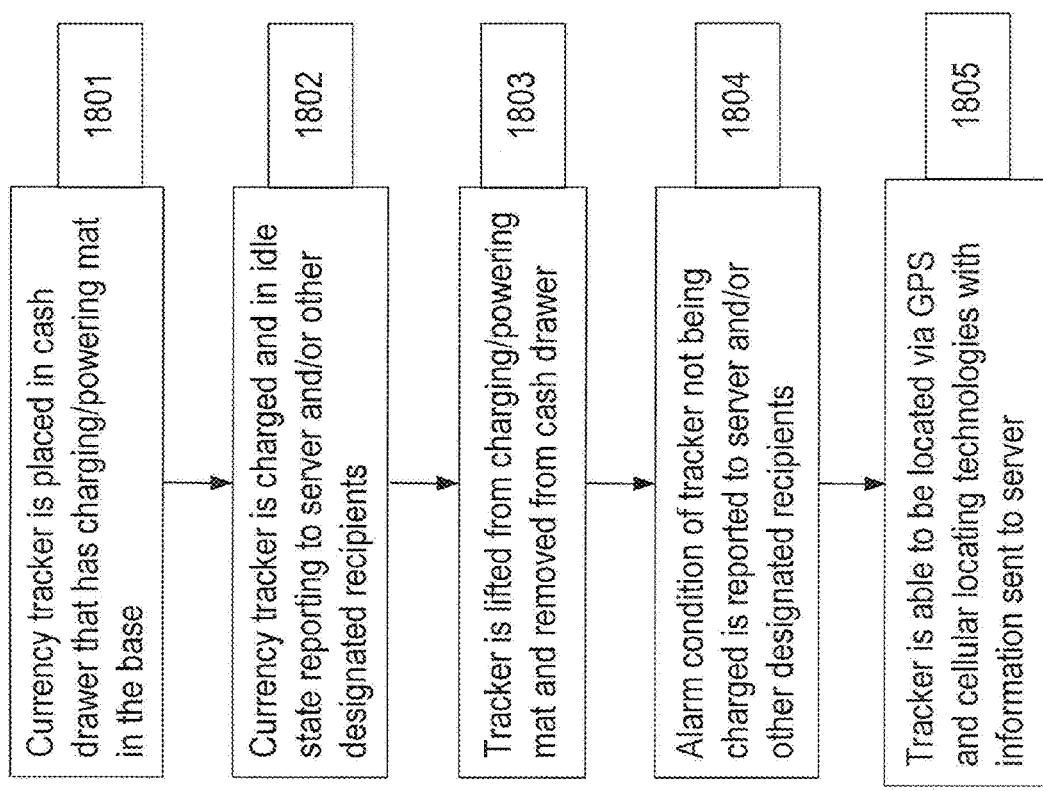
FIG. 18 illustrates an exemplary method of operating a tracking device, according to an implementation of the innovations herein.

FIG. 18 is a flowchart illustrating an exemplary method of receiving power and operating a tracking device that is a wirelessly charged currency tracker, according to the second embodiment of the innovations herein. At 1801 of FIG. 18, a wirelessly charged tracker placed inside a bank bundle as set forth above is placed inside a cash drawer that has a powering/charging mat placed in the base of the cash drawer. At 1802, the currency tracker is charged while being in an idle state. While in this state, the tracker is on and is able to report to the server and/or other recipients regarding the location and status of the tracker. At 1803, the currency tracker is lifted from the powering/charging mat and removed from the cash drawer. Once this happens, at 1804, an alarm condition is triggered and reported to the server and/or designated recipients that the currency tracker has been moved, is no longer being charged, etc. Next, at 1805, the currency tracker performs its tracking functionality as it is located via GPS and/or cellular locating technologies, and this location information may be sent to the server and/or designated recipients.

Additionally, tracking devices consistent with all of the innovations and aspects set forth above/herein may also include a motion sensor and/or acceleration sensor that indicates when the device is moved. With regard to the modes of operation for such motion sensing implementations, the second (triggered) mode of operation may then include commencement of an automatic tracking process, with the predetermined condition that triggers this mode being indication, from the motion sensor and/or acceleration sensor, that the device has been moved.

Figure 19:
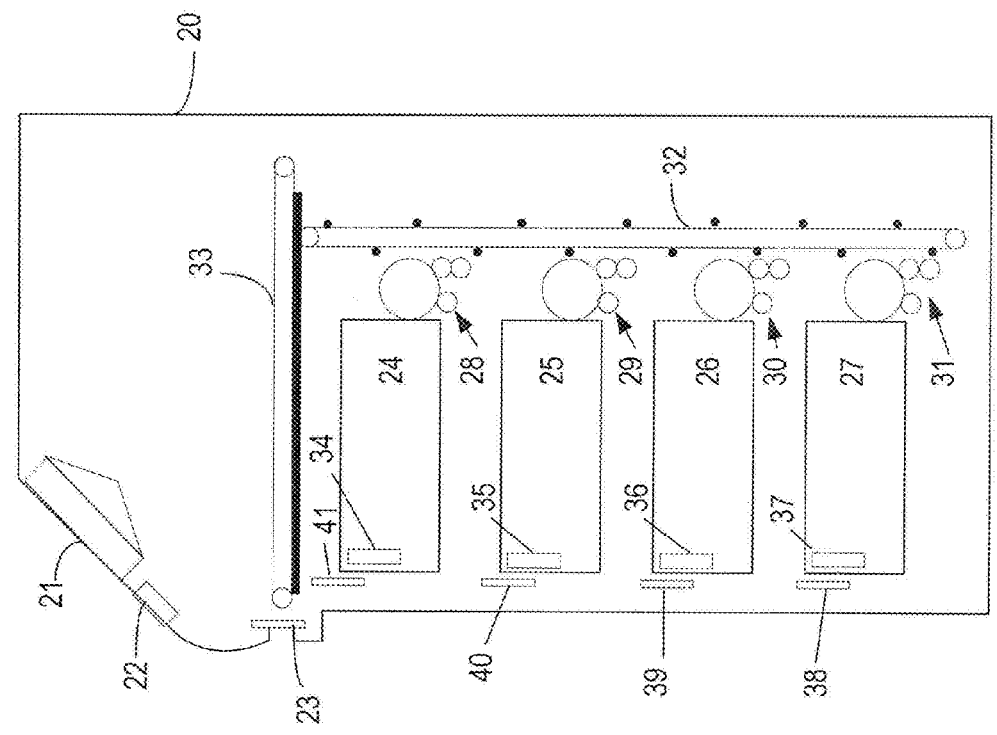
FIG. 19 illustrates a side view schematic diagram of an automated teller machine (ATM), according to an implementation of the innovations herein.

FIG. 19 illustrates a side view schematic diagram of an automated teller machine (ATM), according to an implementation of the innovations herein. Referring to FIG. 19, an exemplary embodiment is given showing an automated teller machine (ATM) 20 housing various components. Here, the basic components for dispensing money and operation of the ATM include a screen 21 used to display information, a keypad 22 for user inputs, and a money dispenser 23. Money for the ATM is stored in cash cassettes 24, 25, 26, and 27 until needed for dispensing. Rollers 28, 29, 30, and 31 are used to transport money from the cash cassettes to transport mechanisms 32 and 33 at which point the currency is dispensed to the user through cash dispenser 23.

Use of the wirelessly charged/powered innovations herein are particularly advantageous with regard to the various moving parts of an ATM as a function of the desire to constantly track the cash cassettes. Embodiments of the innovations herein include use of wirelessly powered and/or charged tracking devices 34, 35, 36, and 37, which may be placed on or inside the cash cassettes. Power may be transferred wirelessly to the tracking devices from transmitters 38, 39, 40, and 41. Further, each individual cash cassette may be individually tracked consistent with these innovations. As with the above embodiments, ATM embodiments may include capabilities such as being constantly powered for status checks, and having an alarm triggered when the cash cassette is removed from the ATM (loss of power transmission), among others. As with other embodiments, the present embodiments may also have the ability to track indoors utilizing CDMA cellular technology. Further, ATM embodiments may also have the ability to detect shock and sudden jolts to the ATM and will detect if the ATM demonstrates a pre-defined amount of tilt and report an alarm for each.

It should be noted that FIG. 19 describes just one exemplary embodiment, where each cash cassette contains a wirelessly powered and/or charged tracking device. However, there may be any combination of trackers to cash cassettes such as having only one cash cassette having a tracking device, two cash cassettes having tracking devices, three cash cassettes having tracking devices, or all cassettes having tracking devices, as described above.

Figure 20:
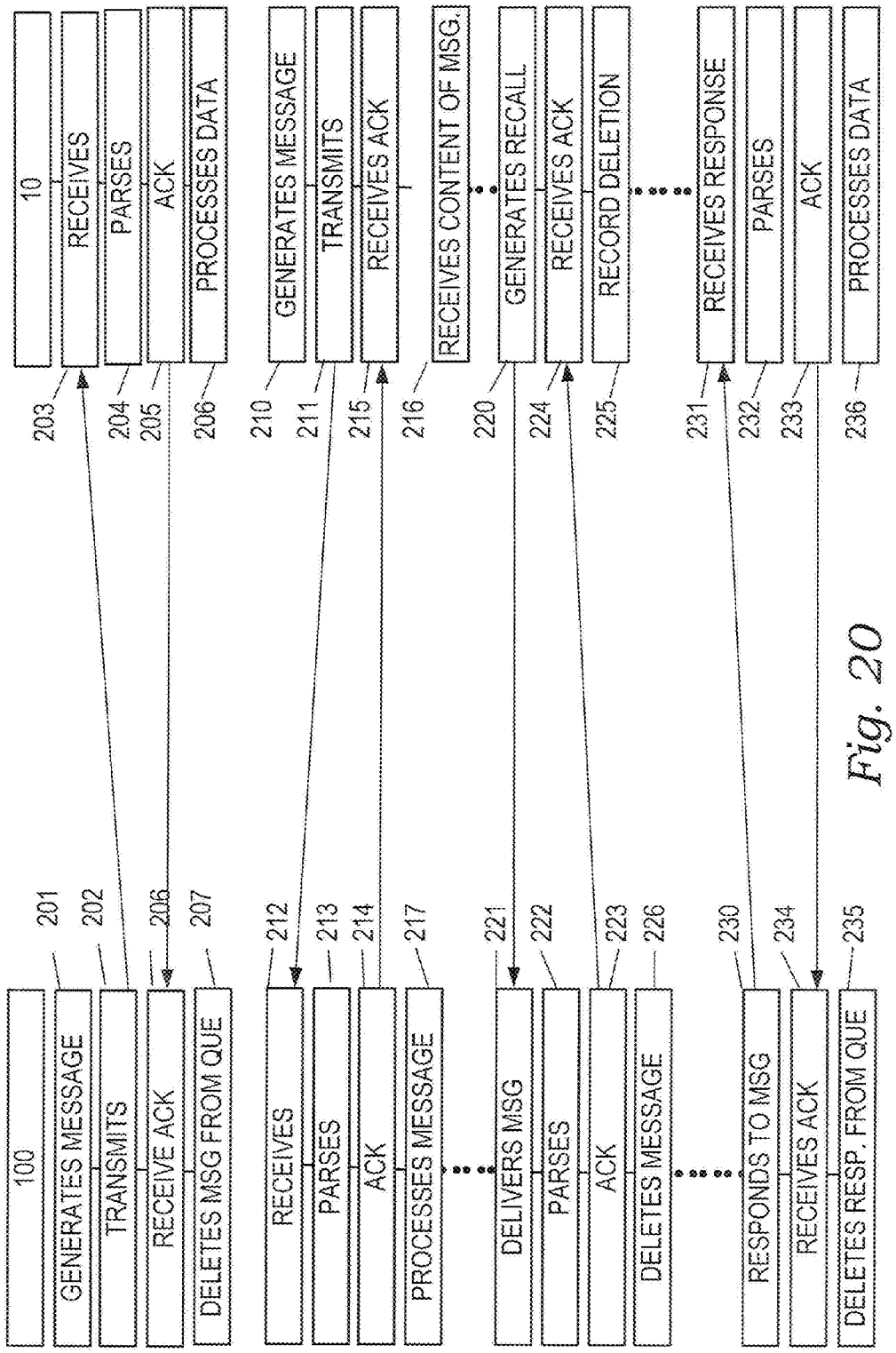
FIG. 20 illustrates a flow diagram showing communication and mode processing, according to an implementation of the innovations herein.

FIG. 20 illustrates a flow diagram showing exemplary features of system communications as may be used in tracking device processing functionality associated with entering alarm states and/or changing modes of operation, according to exemplary implementations of the innovations herein. As discussed above, in some implementations tracking device consistent with the innovations here may operate in and switch between multiple modes of operation. For example, a tracking device may operate in a first or normal mode and then be switched into a second mode upon the occurrence of a predetermined condition, such as the movement of the tracking device into or out of a location of interest. Certain predetermined conditions may trigger a response or mode change via events that are local to or purely internal within the tracking device itself, i.e., without involvement of external processing. For example, attempted removal of security devices from a tracking device that monitors a person may immediately trigger entry into an alarm mode. However, changes between various mode of operation may also be achieved by processing that includes communications with external computing components, such as the administrative hub. Turning then to FIG. 20, a communication process related to messaging is illustrated. First, a tracking device 100 generates message 201. This message may be generated as a result of an alarm condition or predetermined condition such as tampering, low battery, or entry into an exclusion zone, or alternatively may be simply a regularly scheduled transmission of location data. Here, for example, the device may be set in a mode where it takes location readings periodically, typically in intervals of about one to five minutes, and to transmit those readings in batches, typically about every thirty minutes, preferably in a proprietary data packet. Such a data packet preferably has a header identifying message type, a security token, and message data. After the device 100 generates message 201, the message is transmitted 202 and received 203 by administrative hub 10. The data packet is parsed 204 to confirm a message type, the sending device, that security protocol is satisfied, and to determine that the data is not corrupt. Administrative hub 10 then sends an acknowledgement 205 to device 100 which receives the acknowledgement 206 and deletes the message from its outbound message queue 207. If the administrative hub determined the message was corrupt, it would request that the message be resent. If the device 100 did not receive an acknowledgment within a predetermined time period, it would resend the message.

It is also possible for messages and mode change instructions to be generated at the administrative hub 10. These communications might actually be entered by systems personnel at the administrative hub 10 or by monitoring personnel interfacing with the administrative hub via user web client 16 or other suitably enabled device. Accordingly, a typical message generated might be from a probation officer advising an offender with a display equipped monitoring device that he has a court date at a particular time and place; or a message from a dispatcher to a pickup/delivery vehicle advising of an additional address to include on a route; or an administrative change to redefine an exclusion zone or alter a parameter of operation such intervals for taking and reporting location readings. Once the message is generated 210, the messaging hub transmits 211 the message which is received 212 by device 100. The device 100 parses 213 the message for message type and confirms appropriate security token is present and that the message is not corrupt. Then the device 100 generates an acknowledgement 214 which is sent to messaging hub and received 215. The administrative hub 10 then records confirmation that the message was received by device 100. The device 100 proceeds to process the message data 217.

When the administrative hub 10 is messaging device 100 with user display means such as a display or LED screen, messages may be sent which request a response. For instance, probation officer might ask an offender if he needs a ride to a court hearing. A dispatcher might ask a delivery/pickup person if he can make an extra pickup or delivery, and in either case request a reply. In the event that the message is received by the device 100 but there has been no reply, it is possible for the administrative hub to issue a message recall 220. When that recall is received 221 by device 100, it parses recall message 222, generates an appropriate acknowledgement 223, and proceeds to delete the message. The administrative hub receives the acknowledgement 224 and records the deletion of the message 225. Alternatively, if the device user responds to the message 230, the response is sent to the administrative hub 10 and received 231. Then the response is parsed 232 and acknowledged 233, and the administrative hub proceeds to process the data in the response, perhaps informing a dispatcher that the requested pickup or delivery has been accepted by the pickup/delivery driver. The device 100 receives the acknowledgement 234 and proceeds to delete the response from its messaging queue 235. Thus, the invention provides for a robust two-way messaging system with confirmed messaging delivery and message recall capability. The administrative hub 10 has the capability of sending inquiries to the device 100 in order to return information regarding device status and location information.

While the foregoing written description of the various embodiments enables one of ordinary skill to make and use what is considered presently to be the best mode thereof, those of ordinary skill will understand and appreciate the existence of variations, combinations, and equivalents of the specific embodiment, method, and examples herein. The innovations herein should therefore not be limited by the above described embodiment, method, and examples, but by all embodiments and methods within the scope and spirit of the inventions as claimed.

The invention claimed is:

1. A wireless tracking device adapted for physical association with an individual or object to monitor location of the individual or object, the device comprising:
   a battery that powers the tracking device;
   a power receiving device that wirelessly charges the battery upon receipt of wireless energy from a power transmitter configured to transmit the wireless energy;
   location determining circuitry configured for processing tracking device location information;
   communication circuitry configured to process data related to the wireless tracking device for transmission to an administrative hub that is configured to monitor locations of the individuals or objects based upon the data;
a sensor that indicates when the tracking device stops receiving charge from the power receiving device; and
control circuitry which initiates an automatic tracking process when the sensor indicates that the device stops receiving charge from the power receiving device.

2. A wireless tracking device configured to be physical associated with an individual or object for monitoring location of the individual or object, the device comprising:
a power receiving device that generates power from wireless energy received from a power transmitter configured to transmit the wireless energy, wherein output power from the power receiving device is used to operate the tracking device;
location determining circuitry configured for processing tracking device location information;
communication circuitry configured to process data related to the wireless tracking device for transmission to an administrative hub that is configured to monitor locations of the individuals or objects based upon the data;
a sensor that indicates when the tracking device stops receiving charge from the power receiving device; and
control circuitry which initiates an automatic tracking process when the sensor indicates that the device stops receiving charge from the power receiving device.

3. The device of claim 1 or claim 2, wherein the device also generates power directly from the power receiving device for operating the device using the wireless energy received.

4. The device of claim 1 or claim 2, wherein the location determining circuitry includes a GPS component that provides a location of the device that enables tracking.

5. The device of claim 1 or claim 2, wherein the location determining circuitry includes tracking circuitry that performs tracking using cellular technology.

6. The device of claim 5 wherein the cellular technology includes CDMA technology.

7. The device of claim 1 or claim 2 further comprising a motion sensor and/or acceleration sensor that indicates when the device is moved, wherein the control circuitry commences an automatic tracking process when the device has been moved.

8. The device of claim 7 wherein the device is a bracelet or anklet to be affixed to an individual to be monitored.

9. The device of claim 1 or claim 2 wherein the sensor indicates that the device stops receiving charge when the power receiving device is outside a range of the power transmitter.

10. The device of claim 1 or claim 2, wherein the administrative hub has or accesses a location database.

11. The device of claim 1 or claim 2, wherein the tracking device is installed in a cash cassette for an ATM.

12. A wireless tracking system for monitoring bank bills, the device comprising:
a fake bank bill bundle; and
a tracking device disposed in the bundle, the tracking device including:
a battery that powers tracking device circuitry;
a power receiving device that wirelessly charges the battery upon receipt of wireless energy from a power transmitter configured to transmit the wireless energy;
circuitry configured for processing tracking device location information; and
communication circuitry configured to process data related to the device for transmission to an administrative hub that is configured to monitor location of the bundle based upon the data,
wherein the tracking device is integrated into a stack of paper similar in size to currency bills having a cavity for the tracking device and with real currency used to disguise the bundle.

13. A wireless tracking system including a tracking device integrated within a fake bank bill bundle to monitor bank bills, the tracking device comprising:
a power receiving device that generates power from wireless energy received from a power transmitter configured to transmit the wireless energy, wherein output power from the power receiving device is used to operate the tracking device;
circuitry configured for processing tracking device location information; and
communication circuitry configured to process data related to the device for transmission to an administrative hub that is configured to monitor locations of the bundle based upon the data,
wherein the tracking device is integrated into a stack of paper similar in size to currency bills having a cavity for the tracking device and with real currency used to disguise the bundle.

14. The system of claim 12 or claim 13 further comprising circuitry having first and second modes of operation related to determination of location of the device, the device entering the second mode of operation in response to a predetermined condition.

15. The system of claim 12 or claim 13 wherein the bundle has a same thickness as a real bank bundle.

16. The system of claim 12 or claim 13 wherein the bundle has a same flexibility of a real bank bundle.

17. The system of claim 12 or claim 13 wherein, in use, the device is placed in a cash drawer that has the power transmitter associated therewith, such that the device is charged while in the cash drawer.

18. The system of claim 14 wherein the predetermined condition includes loss of received power due to removal of the bundle from the cash drawer, and wherein the second mode includes transmission of an alert to a monitoring station for appropriate action/response.

19. The system claim 12 or claim 13 wherein the device is configured to be constantly powered during operation and further comprising monitoring circuitry configured for continuous performance of health/status checks related to the device and/or for continuous processing of status reports suitable for periodic transmission to the administrative hub.

20. The system of claim 12 or claim 13 wherein the device is configured to be constantly powered during operation such that the device is capable of providing immediate information regarding the device, including the location, without any delay associated with power up.

21. The system of claim 12 wherein output power from the power receiving device is also used to operate the tracking device.

22. The system of claim 12 or claim 13 wherein the location determining circuitry includes a GPS component that provides a location of the device that enables tracking.

23. The system of claim 12 or claim 13 wherein the location determining circuitry includes tracking circuitry that performs tracking using cellular technology.

24. The system of claim 23 wherein the cellular technology includes CDMA technology.

25. The system of claim 14 further comprising a sensor that indicates when the device stops receiving charge from the power receiving device, wherein the second mode includes commencement of an automatic tracking process and the predetermined condition includes indication, by the sensor, that the device is disconnected from the power receiving device.

26. The system of claim 14 further comprising a motion sensor that indicates when the device is moved, wherein the second mode includes commencement of an automatic tracking process and the predetermined condition includes indication, from the motion sensor, that the device has been moved.

27. The system of claim 26 wherein the motion sensor is an acceleration sensor.

28. The system of claim 14 wherein the predetermined condition includes loss of power from the power receiving device.

29. The system of claim 28 wherein the loss of power from the power receiving device is caused by movement of the power receiving device outside the specified range of the power transmitter.

30. The system of claim 12 or claim 13 wherein the administrative hub has or accesses a location database.

31. A method of operating a tracking device, the method comprising:
- receiving wireless energy at a power receiving device;
- converting the received wireless energy into electricity for charging a battery;
- charging the battery with the electricity;
- powering the tracking device using electricity stored within the battery;
- determining when the tracking device stops receiving charge from the power receiving device;
- initiating an automatic tracking process when the tracking device stops receiving charges from the power receiving device; and
- communicating information associated with the tracking device to track an individual or object with which the tracking device is physically associated.

32. The method of claim 31 further comprising sending power, via a power transmitter, for receipt by the power receiving device.

33. The method of claim 31 further comprising conditioning the received wireless energy for charging the battery.

34. The method of claim 31 further comprising powering a GPS component configured to provides a location of the device used in tracking processing.

35. A method of operating a tracking device, the method comprising:
- receiving wireless energy at a power receiving device;
- converting the received wireless energy into electrical power;
- powering circuitry within the tracking device via the electrical power;
- determining when the tracking device stops receiving charge from the power receiving device;
- initiating an automatic tracking process when the tracking device stops receiving charge from the power receiving device; and
- communicating information associated with the tracking device to track an individual or object with which the tracking device is physically associated.

36. The method of claim 35 further comprising sending power, via a power transmitter, for receipt by the power receiving device.

37. The method of claim 35 further comprising conditioning the received wireless energy for charging the battery.

38. The method of claim 35 further comprising powering a GPS component configured to provides a location of the device used in tracking processing.

39. A method of operating a tracking device, the method comprising:
- receiving wireless energy at a power receiving device;
- converting the received wireless energy into electrical power;
- powering circuitry within the tracking device via the electrical power;
- recharging a battery associated with the tracking device via the electrical power;
- determining when the tracking device stops receiving charge from the power receiving device;
- initiating an automatic tracking process when the tracking device stops receiving charge from the power receiving device; and
- communicating information associated with the tracking device to track an individual or object with which the tracking device is physically associated.

40. The method of claim 39 further comprising sending power, via a power transmitter, for receipt by the power receiving device.

41. The method of claim 39 further comprising conditioning the received wireless energy for charging the battery.

42. The method of claim 39 further comprising powering a GPS component configured to provides a location of the device used in tracking processing.

* * * * *